(12) United States Patent
Yoshida et al.

(10) Patent No.: US 8,414,801 B2
(45) Date of Patent: Apr. 9, 2013

(54) CONDUCTIVE POLYMER SOLUTION, ANTISTATIC COATING MATERIAL, ANTISTATIC HARD COAT LAYER, OPTICAL FILTER, CONDUCTIVE COATING FILM, ANTISTATIC TACKY ADHESIVE, ANTISTATIC TACKY ADHESIVE LAYER, PROTECTIVE MATERIAL, AND METHOD FOR PRODUCING THE SAME

(75) Inventors: Kazuyoshi Yoshida, Kazo (JP); Tailu Ning, Saitama (JP); Yasushi Masahiro, Saitama (JP); Rika Abe, Saitama (JP); Yutaka Higuchi, Otsu (JP)

(73) Assignee: Shin-Etsu Polymer Co., Ltd. (JP)

( * ) Notice: Subject to any disclaimer, the term of this patent is extended or adjusted under 35 U.S.C. 154(b) by 915 days.

(21) Appl. No.: 12/537,811

(22) Filed: Aug. 7, 2009

(65) Prior Publication Data
US 2009/0294735 A1   Dec. 3, 2009

Related U.S. Application Data

(63) Continuation of application No. 11/372,444, filed on Mar. 9, 2006, now Pat. No. 7,618,559.

(30) Foreign Application Priority Data

| Mar. 11, 2005 | (JP) | ................................. | 2005-068935 |
| Mar. 11, 2005 | (JP) | ................................. | 2005-068936 |
| May 17, 2005 | (JP) | ................................. | 2005-144030 |
| Aug. 15, 2005 | (JP) | ................................. | 2005-235208 |

(51) Int. Cl.
*H01B 1/00*   (2006.01)
*C08G 75/00*   (2006.01)
*C08G 73/06*   (2006.01)

(52) U.S. Cl. ......................... 252/500; 528/377; 528/423

(58) Field of Classification Search ........ 252/500–521.6; 528/373, 422, 423, 377
See application file for complete search history.

(56) References Cited

U.S. PATENT DOCUMENTS

2002/0077450 A1   6/2002   Kirchmeyer et al.

FOREIGN PATENT DOCUMENTS

| DE | 100 58 116 | 5/2002 |
| JP | 03-222207 | 10/1991 |
| JP | 05-186619 | 7/1993 |
| JP | 06-206986 | 7/1994 |
| JP | 06-295016 | 10/1994 |
| JP | 07-090060 | 4/1995 |
| JP | 07-118524 | 5/1995 |
| JP | H07-118524 | 5/1995 |
| JP | 07-165892 | 6/1995 |
| JP | 07-238149 | 9/1995 |

(Continued)

OTHER PUBLICATIONS

Notice of Reasons for Rejection dated Jun. 21, 2011 in corresponding Japanese Patent Application No. 2005-235208 (with English translation).

(Continued)

*Primary Examiner* — Mark Kopec
*Assistant Examiner* — Jaison Thomas
(74) *Attorney, Agent, or Firm* — Ostrolenk Faber LLP

(57) ABSTRACT

The conductive polymer solution of the present invention contains a π-conjugated conductive polymer, a solubilizable polymer, a phase transfer catalyst, and an organic solvent. The method for preparing a conductive polymer solution of the present invention comprises adding a phase transfer catalyst adding an organic solvent to an aqueous polymer solution prepared by dissolving the π-conjugated conductive polymer and a solubilizable polymer in water.

10 Claims, 1 Drawing Sheet

FOREIGN PATENT DOCUMENTS

| | | |
|---|---|---|
| JP | 8-231863 | 10/1996 |
| JP | 09-031222 | 2/1997 |
| JP | 2001-106994 | 4/2001 |
| JP | 2001-301819 | 10/2001 |
| JP | A-2002-206022 | 7/2002 |
| JP | 2003-213148 | 7/2003 |
| JP | 2005-126081 | 5/2005 |
| JP | 2005-314629 | 11/2005 |
| JP | 2005-317528 | 11/2005 |
| JP | 2006-045383 | 2/2006 |
| JP | A-2006-249303 | 9/2006 |
| JP | 2007-531206 | 11/2007 |
| WO | WO 2005/035626 | 4/2005 |
| WO | 2005/096392 | 10/2005 |
| WO | WO 2005/096392 A2 | 10/2005 |

OTHER PUBLICATIONS

Notice of Allowance dated Jun. 14, 2011 in corresponding Japanese Patent Application No. 2005-068935 (with English translation).

Notice of Reasons for Rejection dated Mar. 22, 2011 in corresponding Japanese Patent Application No. 2005-068936 (with English translation).

Notice of Reasons for Rejection dated Mar. 22, 2011 in corresponding Japanese Patent Application No. 2005-144030 (with English translation).

European Search Report dated Mar. 26, 2008 issued in corresponding EU Appln. No. 06714773.6.

Saito T., et al., "Conducting Composition Conductor Formation Contain Aniline Based Polymer Sulphone Group High Molecular Compound Water Amine Quaternary Ammonium Salt," May 9, 1995, XP-002472383—Derwent Publications Ltd. *Abstract*.

Youngkwan Lee et al., "Synthesis and Characterization of a Soluble and Transparent Conducting Polymer, Poly(,4-Ethylenedioxythiophene)," XP-001062592—Molecular Crystals and Liquid Crystals, 1999, vol. 327, pp. 237-240.

Louis M. Leung et al., "Short poly(phenylene vinylene) chains grafted poly(organophosphazene)," XP-002472440—Polymer, vol. 43, 2002, pp. 233-237.

*Date stamped* letter from EU Associate in corresponding EU Appln. No. 06714773.6.

Notice of Allowance dated Apr. 17, 2012 in corresponding Japanese Patent Application No. 2005-235208 (with English translation).

US 8,414,801 B2

CONDUCTIVE POLYMER SOLUTION, ANTISTATIC COATING MATERIAL, ANTISTATIC HARD COAT LAYER, OPTICAL FILTER, CONDUCTIVE COATING FILM, ANTISTATIC TACKY ADHESIVE, ANTISTATIC TACKY ADHESIVE LAYER, PROTECTIVE MATERIAL, AND METHOD FOR PRODUCING THE SAME

CROSS REFERENCE TO RELATED APPLICATIONS

This is a continuation of pending U.S. patent application Ser. No. 11/372,444, filed Mar. 9, 2006 in the name of Kazuyoshi et al., entitled CONDUCTIVE POLYMER SOLUTION, ANTISTATIC COATING MATERIAL, ANTISTATIC HARD COAT LAYER, OPTICAL FILTER, CONDUCTIVE COATING FILM, ANTISTATIC TACKY ADHESIVE LAYER, PROTECTIVE MATERIAL, AND METHOD FOR PRODUCING THE SAME, which claims priority of Japanese Patent Application No. 2005-068935 filed on Mar. 11, 2005, Japanese Patent Application No. 2005-068936 filed on Mar. 11, 2005, Japanese Patent Application No. 2005-144030 filed on May 17, 2005 and Japanese Patent Application No. 2005-235208 filed on Aug. 15, 2005, the disclosures of which are incorporated by reference herein.

BACKGROUND OF THE INVENTION

1. Field of the Invention

The present invention relates to a conductive polymer solution containing a π-conjugated conductive polymer, and a method for producing the same.

Also, the present invention relates to an antistatic coating material which forms an antistatic coating film. Furthermore, the present invention relates to an antistatic hard coat layer, and an optical filter.

Furthermore, the present invention relates to a conductive polymer solution containing a π-conjugated conductive polymer, and a conductive coating film.

Furthermore, the present invention relates to an antistatic tacky adhesive having antistatic properties and adhesiveness, and an antistatic tacky adhesive layer. Furthermore, the present invention relates to a protective material such as protective tape, protective sheet or protective film.

2. Description of the Related Art

Conductive materials prepared by adding (doping) an electron donating compound or an electron accepting compound (dopant) to a π-conjugated conductive polymer such as polypyrrole, polythiophene, polyacetylene, polyparaphenylene or polyaniline have recently been developed and their use is increasing.

Generally, a π-conjugated conductive polymer, in which a main chain is composed of a π-conjugated system containing π electrons, is synthesized by an electrolytic polymerization method and a chemical oxidative polymerization method.

In the electrolytic polymerization method, a substrate formed previously of an electrode material is dipped in a solution mixture of an electrolyte serving as a dopant and a precursor monomer, which forms a π-conjugated conductive polymer, to form a π-conjugated conductive polymer in the form of a film on the substrate. Therefore, it is difficult to produce a large amount of the π-conjugated conductive polymer.

In the chemical oxidative polymerization method, there is not such a restriction and a large amount of the π-conjugated conductive polymer can be prepared in a solution by adding an oxidizing agent and an oxidative polymerization catalyst to a precursor monomer of a π-conjugated conductive polymer.

However, in the chemical oxidative polymerization method, with the growth of the conjugated system of the π-conjugated conductive polymer main chain, solubility in solvent becomes inferior, and therefore the π-conjugated conductive polymer is obtained in the form of an insoluble solid powder. In case of the insoluble solid powder, it becomes difficult to uniformly form a π-conjugated conductive polymer membrane on the surface of the substrate.

Therefore, there have been made a trial of a method of solubilizing a π-conjugated conductive polymer by introducing a functional group, a method of solubilizing by dispersing in a binder resin, and a method of solubilizing by adding an anion group-containing polymer acid.

For example, there is proposed a method of preparing an aqueous poly(3,4-dialkoxythiophene) solution by chemical oxidative polymerization of 3,4-dialkoxythiophene using an oxidizing agent in the presence of polystyrenesulfonic acid as an anion group-containing polymer acid having a molecular weight within a range from 2000 to 500000 so as to improve dispersibility in water (see, for example, Japanese Patent No. 2,636,968). There is also proposed a method of preparing an aqueous colloidal π-conjugated conductive polymer solution by chemical oxidative polymerization in the presence of polyacrylic acid (see, for example, Japanese Unexamined Patent Application, First Publication No. Hei 7-165892).

Generally, the surface of an optical filter or an optical information recording medium is provided with a hard coat layer so as to prevent scratching. In these optical applications, not only high hardness but also excellent transparency and antistatic properties for prevention of adhesion of dusts due to static electricity are required to the hard coat layer.

With respect to antistatic properties, it is required that the value of surface resistance is stable within a range from about $10^6$ to $10^{10}\Omega$ (that is, stable antistatic properties).

As the hard coat layer for an optical filter or an optical information recording medium, a coating film formed by coating an antistatic coating material containing a π-conjugated conductive polymer and a hard coat component may be used.

It is known that, although the π-conjugated conductive polymer itself is insoluble, the π-conjugated conductive polymer can be converted into an aqueous solution by chemical oxidative polymerization of a precursor monomer of the π-conjugated conductive polymer in the presence of an anion group-containing polymer acid (see, for example, Japanese Patent No. 2,636,968). A coating film having antistatic properties can be formed by coating the aqueous solution of the π-conjugated conductive polymer. However, when water is used as a solvent, it requires a long time to form a coating film because for low drying rate. When the π-conjugated conductive polymer is water soluble, since compatibility with the hard coat component becomes inferior, a hard coat layer having sufficient performances could not be obtained.

To solve this problem, a conductive polymer composed of a polymer of β alkylpyrrole in which a long chain alkyl group is introduced into the β-position of pyrrole is described in Japanese Patent No. 3,024,867. This conductive polymer has a bulky alkyl group and is therefore soluble in a volatile organic solvent and is also excellent in compatibility with the hard coat component.

There have also been made a trial of a method of solubilizing by introducing a functional group into a π-conjugated conductive polymer, a method of solubilizing by dispersing in a binder resin, and a method of solubilizing by adding a polyanion.

As a method of forming a conductive film on a base material, for example, there is proposed a method comprising the steps of dissolving an oxidizing agent, a vinyl chloride-based copolymer, and a monomer, which forms a π-conjugated conductive polymer, in a solvent, coating the resulting coating solution onto a base material, and polymerizing the monomer while controlling an oxidation potential using a solvent to form a complex of the vinyl chloride-based copolymer and the conductive polymer (see Japanese Unexamined Patent Application, First Publication No. Hei 5-186619).

According to the purposes, excellent thermostability is sometimes required to the conductive film. There is proposed a method comprising the steps of mixing a monomer with a compound, as a dopant, having a structure similar to that of a sulfonated substance which can be used as an antioxidant, and electrolytically polymerizing the mixture for the purpose of forming a conductive film having excellent thermostability (see Japanese Patent No. 2,546,617).

To mechanically or electrically protect the surface of various components and articles and to prevent penetration of dusts or moisture into precision instruments, components, articles, and precision instruments may have hitherto been coated with a protective material such as protective tape, protective sheet or protective film upon storage, conveyance, transportation or processing.

Generally, the protective material to be used comprises a base material and a tacky adhesive layer, formed on the base material, for applying onto components or articles. By the way, static electricity is generated when the protective material is removed. Therefore, when a protective material is applied to a display, a polarizing plate and electronic components so as to protect them, damage or deterioration of function may arise. To solve such a problem, there is proposed that antistatic properties are imparted to the protective material (see, for example, Japanese Unexamined Patent Application, First Publication No. 2001-301819, Japanese Unexamined Patent Application, First Publication No. 2001-106994, Japanese Unexamined Patent Application, First Publication No. Hei 6-295016 and Japanese Unexamined Patent Application, First Publication No. Hei 9-31222). Particularly in Japanese Unexamined Patent Application, First Publication No. Hei 6-295016 and Japanese Unexamined Patent Application, First Publication No. Hei 9-31222, there is proposed that an antistatic tacky adhesive layer is formed by coating a water soluble coating solution containing a π-conjugated conductive polymer onto a base material. However, in case of the water soluble coating solution, the drying time increases and therefore it was required to replace by an organic solvent-based coating solution.

Therefore, in Japanese Unexamined Patent Application, First Publication No. 2005-126081, there is provided that an aqueous polythiophene solution is converted into an alcohol solution of polythiophene and an acrylic polymer is dispersed in the alcohol solution of polythiophene to prepare a conductive pressure-sensitive adhesive dispersed in the alcohol, and the pressure-sensitive adhesive is used as a tacky adhesive layer.

As described above, the conductive polymer solution containing a π-conjugated conductive polymer, which has hitherto been proposed, is an aqueous solution and when a coating film is formed by coating the aqueous solution, productivity of the conductive coating film was inferior because a long drying time is required. When the π-conjugated conductive polymer is water soluble, its use was limited because of poor compatibility with the hydrophobic resin such as hard coat resin.

Under these circumstances, the present invention has been made and an object thereof is to provide a conductive polymer solution which can decrease the drying time required to form a coating film and is excellent in compatibility between the π-conjugated conductive polymer and the hydrophobic resin, and a method for producing the same.

Since the conductive polymer described in Japanese Unexamined Patent Application, First Publication No. Hei 7-165892 has low conductivity, when it is dissolved in an organic solvent to prepare a coating material, predetermined antistatic properties could not be secured if the content of the conductive polymer does not increase. When the coating material containing a large amount of the conductive polymer is coated to form a coating film, there arises a problem that the coating film is colored and transparency deteriorates. Even in case of the conductive polymer described in Japanese Unexamined Patent Application, First Publication No. Hei 7-165892, it is insufficient in compatibility with various hard coat resins each having different polarity and also a special monomer such as β-alkylpyrrole is very expensive and is not suited for practical use.

Under these circumstances, the present invention has been made and an object thereof is to provide an antistatic coating material which secures compatibility between the π-conjugated conductive polymer and the hard coat component and can form a coating film having both antistatic properties and transparency. Another object is to provide a hard coat layer which has high hardness and also has both antistatic properties and transparency. Still another object is to provide an optical filter which has high hardness and comprises a hard coat layer having both antistatic properties and transparency.

In the meted described in Japanese Unexamined Patent Application, First Publication No. Hei 5-186619, since the solvent is limited according to the kind of the base material, the polymerization of the monomer due to control of an oxidation potential is limited and therefore high conductivity can not be secured. Since the vinyl chloride-based copolymer as an insulating resin is contained, high conductivity can be secured.

In the method described in Japanese Patent No. 2,636,968, a large amount of the polyanion is contained so as to improve water dispersibility of the π-conjugated conductive polymer. Therefore, there was a problem that high conductivity is hardly obtained. Accordingly, a conductive polymer solution having both excellent conductivity and solvent solubility is required.

In the method described in Japanese Patent No. 2,546,617, there was a problem that the resulting coating film has thermostability, but solvent solubility can not be secured.

Under these circumstances, the present invention has been made and an object thereof is to provide a conductive polymer solution which is excellent in both conductivity and solvent solubility. Another object is to provide a conductive polymer solution which can enhance thermostability of the coating film. Still another object is to provide a conductive coating film which is excellent in conductivity. A further object is to provide a conductive coating film which is also excellent in thermostability.

In the tacky adhesive described in Japanese Unexamined Patent Application, First Publication No. 2005-126081, an organic solvent other than an alcohol can not be used and also an acrylic polymer as a tacky adhesive component was limited. In the tacky adhesive described in Japanese Unexamined Patent Application, First Publication No. 2005-126081, although pot life upon coating is secured, storage stability is not sufficiently excellent and it was difficult to store for only several days. For example, when several days have passed after preparation, the π-conjugated conductive polymer is aggregated and separated, and thus transparency and conductivity of the tacky adhesive layer may deteriorate.

Under these circumstances, the present invention was made and an object thereof is to provide an antistatic tacky adhesive in which a liquid organic compound other than an alcohol can be used as a solvent and the acrylic polymer is not limited and also storage stability is excellent. Another object is to provide an antistatic tacky adhesive layer which is excellent in transparency and antistatic properties, and a protective material.

BRIEF SUMMARY OF THE INVENTION

The conductive polymer solution of the present invention comprises a π-conjugated conductive polymer, a solubilizable polymer, a phase transfer catalyst, and an organic solvent.

The conductive polymer solution of the present invention can contain a binder resin.

The method for preparing a conductive polymer solution according to claim 3 of the present application comprises adding a phase transfer catalyst after adding an organic solvent to an aqueous polymer solution prepared by dissolving a π-conjugated conductive polymer and a solubilizable polymer in water.

The method for preparing a conductive polymer solution according to claim 4 of the present application comprises adding a phase transfer catalyst to an aqueous polymer solution prepared by dissolving a π-conjugated conductive polymer and a solubilizable polymer in water thereby to precipitate a mixture containing the π-conjugated conductive polymer, the solubilizable polymer and the phase transfer catalyst, and adding an organic solvent to the mixture.

The conductive resin of the present invention is obtained by removing an organic solvent from the above conductive polymer solution.

The antistatic coating material of the present invention comprises a π-conjugated conductive polymer, a solubilizable polymer, a phase transfer catalyst, a hard coat component, and an organic solvent.

The antistatic hard coat layer of the present invention is formed by coating the above antistatic coating material.

The optical filter of the present invention comprises the above antistatic hard coat layer.

The conductive polymer solution of the present invention comprises a π-conjugated conductive polymer, a polyanion, a nitrogen-containing compound, and a solvent, wherein The nitrogen-containing compound has at least one nitrogen-containing functional group selected from urea group, urethane group, biuret group, imide group or amide group, and a nitrogen atom of the nitrogen-containing functional group is quaternized.

In the conductive polymer solution of the present invention, the nitrogen-containing compound preferably has at least one unsaturated double bond.

The conductive coating film of the present invention is formed by coating the above conductive polymer solution.

The antistatic tacky adhesive of the present invention comprises a π-conjugated conductive polymer, a solubilizable polymer, a phase transfer catalyst, and a tacky adhesive component.

The antistatic tacky adhesive layer of the present invention is formed by coating the above antistatic tacky adhesive.

The protective material of the present invention comprises a base material and the above antistatic tacky adhesive layer formed on the base material.

The conductive polymer solution of the present invention can decrease the drying time required to form a coating film and the π-conjugated conductive polymer is compatible with the hydrophobic resin.

According to the method for preparing a conductive polymer solution of the present invention, the drying time required to form a coating film can be decreased and there can be prepared a conductive polymer solution in which the π-conjugated conductive polymer is easily compatible with the hydrophobic resin.

In the antistatic coating material of the present invention, compatibility between the π-conjugated conductive polymer and the hard coat component can be secured and a coating film having both antistatic properties and transparency can be formed.

The hard coat layer of the present invention has high hardness and also has both antistatic properties and transparency.

The optical filter of the present invention has high hardness and also comprises a hard coat layer having both antistatic properties and transparency.

The conductive polymer solution of the present invention is excellent in both conductivity and solvent solubility.

In the conductive polymer solution of the present invention, when the nitrogen-containing compound has at least one unsaturated double bond, thermostability of the coating film formed of the conductive polymer solution can be enhanced and also conductivity can be further improved.

The conductive coating film of the present invention is excellent in conductivity.

In the antistatic tacky adhesive of the present invention, a liquid organic compound other than an alcohol can be used as a solvent and an acrylic polymer is not limited, and also storage stability is excellent.

The antistatic tacky adhesive layer and the protective material of the present invention is excellent in transparency and antistatic properties.

BRIEF DESCRIPTION OF THE DRAWINGS

Some of the features and advantages of the invention have been described, and others will become apparent from the detailed description which follows and from the accompanying drawings, in which.

BRIEF DESCRIPTION OF THE REFERENCE SYMBOLS

Figure 1:
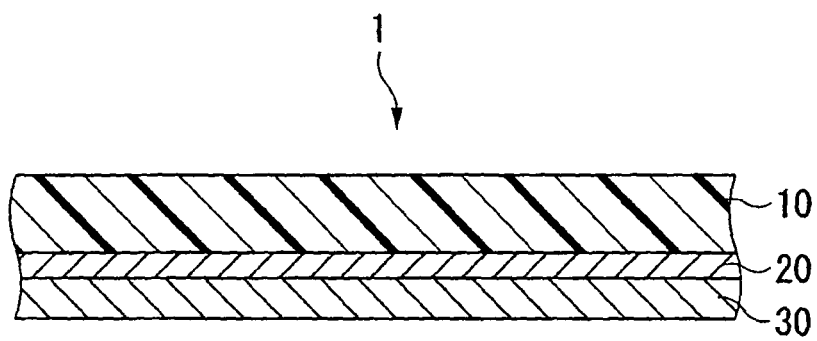
FIG. 1 is a sectional view showing an embodiment of an optical filter of the present invention.

1: Optical filter
20: Antistatic hard coat layer

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

(π-Conjugated Conductive Polymer)

As the π-conjugated conductive polymer, an organic polymer whose main chain is composed of a π-conjugated system can be used. Examples thereof include polypyrroles, polythiophenes, polyacetylenes, polyphenylenes, polyphenylenevinylenes, polyanilines, polyacenes, polythiophenevinylenes, and copolymers thereof. In view of ease of polymerization and stability in an air, polypyrroles, polythiophenes, and polyanilines are preferable.

Although sufficient conductivity can be obtained even if the π-conjugated conductive polymer is not substituted with a substituent, it is preferable to introduce a functional group such as alkyl group, carboxy group, sulfo group, alkoxy group, hydroxy group or cyano group into the π-conjugated conductive polymer so as to more enhance conductivity.

Although sufficient conductivity and compatibility with a hard coat component can be obtained even if the π-conjugated conductive polymer is not substituted with a substituent, it is preferred to introduce a functional group such as alkyl group, carboxy group, sulfo group, alkoxy group, hydroxy group or cyano group so as to more enhance conductivity and compatibility with a hard coat component.

Specific examples of the π-conjugated conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

Among these polymers, (co)polymers composed of one or more polymers selected from polypyrrole, polythiophene, poly(N-methylpyrrole), poly(3-methylthiophene), poly(3-methoxythiophene), or poly(3,4-ethylenedioxythiophene) are preferably used in view of resistance value and reactivity.

Furthermore, polypyrroles and poly(3,4-ethylenedioxythiophene) are more preferable because conductivity is more excellent and heat resistance is improved.

An alkyl-substituted compound such as poly(N-methylpyrrole) or poly(3-methylthiophene) is more preferable because solvent solubility is further improved and also compatibility and dispersibility are further improved when a hydrophobic resin is added. Among alkyl groups in the alkyl-substituted compound, a methyl group is preferable because lowering of conductivity is improved.

Furthermore, polystyrenesulfonic acid doped poly(3,4-ethylenedioxythiophene) (abbreviated to PEDOT-PSS) has comparatively high thermostability and low polymerization degree and is therefore preferable because transparency after forming a coating film is improved.

The π-conjugated conductive polymer can be easily prepared by chemical oxidative polymerization of a precursor monomer, which forms the π-conjugated conductive polymer, in a solvent in the presence of a proper oxidation agent and a polymer having an anion group described hereinafter.

The precursor monomer has a π-conjugated system and the π-conjugated system is formed in a main chain when it is polymerized by an action of the proper oxidizing agent. Examples thereof include pyrroles and derivatives thereof, thiophenes and derivatives thereof, and anilines and derivatives thereof.

Specific examples of the precursor monomer include pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxylpyrrole, 3-methyl-4-carboxylpyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, 3-methyl-4-hexyloxypyrrole, thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, aniline, 2-methylaniline, 3-isobutylaniline, 2-anilinesulfonic acid, and 3-anilinesulfonic acid.

(Solvent)

The solvent used in the preparation of the π-conjugated conductive polymer is not specifically limited and may be a solvent in which the precursor monomer can be dissolved or dispersed and which can maintain oxidizability of the oxidizing agent. Examples of the solvent include water; polar solvents such as N-methyl-2-pyrrolidone, N,N-dimethylformamide, N,N-dimethylacetamide, dimethyl sulfoxide, hexamethylenephosphortriamide, acetonitrile, and benzonitrile; phenols such as cresol, phenol, and xylenol; alcohols such as methanol, ethanol, propanol, and butanol; ketones such as acetone and methyl ethyl ketone; hydrocarbons such as hexane, benzene, and toluene; carboxylic acids such as formic acid and acetic acid; carbonate compounds such as ethylene carbonate and propylene carbonate; ether compounds such as dioxane and diethyl ether; chain ethers such as ethylene glycol dialkyl ether, propylene glycol dialkyl ether, polyethylene glycol dialkyl ether, and polypropylene glycol dialkyl ether; heterocyclic compounds such as 3-methyl-2-oxazolidinone; and nitrile compounds such as acetonitrile, glutarodinitrile, methoxyacetonitrile, propionitrile, and benzonitrile. These solvents may be used alone, or used as a mixture of two or more kinds of these solvent, or a mixture with the other organic solvent.

The oxidizing agent may be any oxidizing agent which can oxidize the precursor monomer to obtain a π-conjugated conductive polymer, and examples thereof include peroxodisulfates such as ammonium peroxodisulfate, sodium peroxodisulfate, and potassium peroxodisulfate; transition metal compounds such as ferric chloride, ferric sulfate, ferric nitrate, and cupric chloride; metal halogen compounds such as boron trifluoride and aluminum chloride; metal oxides such as silver oxide and cesium oxide; peroxides such as hydrogen peroxide and ozone; organic peroxides such as benzoyl peroxide; and oxygen.

(Solubilizable Polymer)

The solubilizable polymer is a polymer which solubilizes the π-conjugated conductive polymer, and examples of the solubilizable polymer include polymers having an anion group and/or an electron attractive group.

[Polymer Having Anion Group (Polyanion)]

The polymer having an anion group (hereinafter referred to as a polyanion) includes a substituted or unsubstituted polyalkylene, a substituted or unsubstituted polyalkenylene, a substituted or unsubstituted polyimide, a substituted or unsubstituted polyamide, a substituted or unsubstituted polyester and copolymers thereof, and is composed of a constituent unit having an anion group. The polyanion may be composed of a constituent unit having an anion group and a constituent unit having an anion group and no anion group.

The anion group of the polyanion functions as a dopant to the π-conjugated conductive polymer, thereby to improve conductivity and heat resistance of the π-conjugated conductive polymer.

The polyalkylene is a polymer whose main chain is composed of a repeating unit of methylene. Examples of the polyalkylene include polyethylene, polypropylene, polybutene, polypentene, polyhexene, polyvinyl alcohol, polyvinylphenol, poly 3,3,3-trifluoropropylene, polyacrylonitrile, polyacrylate, and polystyrene.

The polyalkenylene is a polymer composed of a constituent unit whose main chain has at least one unsaturated bond (vinyl group). Specific examples of the polyalkenylene include polymers containing at least one constituent unit selected from propenylene, 1-methylpropenylene, 1-butylpropenylene, 1-decylpropenylene, 1-cyanopropenylene, 1-phenylpropenylene, 1-hydroxypropenylene, 1-butenylene, 1-methyl-1-butenylene, 1-ethyl-1-butenylene, 1-octyl-1-butenylene, 1-pentadecyl-1-butenylene, 2-methyl-1-butenylene, 2-ethyl-1-butenylene, 2-butyl-1-butenylene, 2-hexyl-1-butenylene, 2-octyl-1-butenylene, 2-decyl-1-butenylene, 2-dodecyl-1-butenylene, 2-phenyl-1-butenylene, 2-butenylene, 1-methyl-2-butenylene, 1-ethyl-2-butenylene, 1-octyl-2-butenylene, 1-pentadecyl-2-butenylene, 2-methyl-2-butenylene, 2-ethyl-2-butenylene, 2-butyl-2-butenylene, 2-hexyl-2-butenylene, 2-octyl-2-butenylene, 2-decyl-2-butenylene, 2-dodecyl-2-butenylene, 2-phenyl-2-butenylene, 2-propylenephenyl-2-butenylene, 3-methyl-2-butenylene, 3-ethyl-2-butenylene, 3-butyl-2-butenylene, 3-hexyl-2-butenylene, 3-octyl-2-butenylene, 3-decyl-2-butenylene, 3-dodecyl-2-butenylene, 3-phenyl-2-butenylene, 3-propylenephenyl-2-butenylene, 2-pentenylene, 4-propyl-2-pentenylene, 4-butyl-2-pentenylene, 4-hexyl-2-pentenylene, 4-cyano-2-pentenylene, 3-methyl-2-pentenylene, 4-ethyl-2-pentenylene, 3-phenyl-2-pentenylene, 4-hydroxy-2-pentenylene, or hexenylene.

Among these constituent units, a substituted or unsubstituted butenylene is preferable because it exerts an interaction between an unsaturated bond and a π-conjugated conductive polymer and is easily synthesized from a substituted or unsubstituted butadiene as a starting material.

Examples of the polyimide include polyimides of anhydrides such as pyromellitic acid diahydride, biphenyltetracarboxylic acid diahydride, benzophenonetetracarboxylic acid diahydride, 2,2,3,3-tetracarboxydiphenylether dianhydride, and 2,2-[4,4'-di(dicarboxyphenyloxy)phenyl]propane dianhydride, and diamines such as oxydiamine, paraphenylenediamine, metaphenylenediamine, and benzophenonediamine.

Examples of the polyamide include polyamide 6, polyamide 6,6, and polyamide 6,10.

Examples of the polyester include polyethylene terephthalate and polybutylene terephthalate.

When the polyanion has a substituent, examples of the substituent include alkyl group, hydroxy group, amino group, carboxy group, cyano group, phenyl group, phenol group, ester group, and alkoxy group. Taking account of solubility in solvent, heat resistance and compatibility with resin, an alkyl group, a hydroxy group, a phenol group, and an ester group are preferable.

The alkyl group can enhance solubility and dispersibility in polar solvent or nonpolar solvent, compatibility and dispersibility with resin, and the hydroxy group can promote formation of a hydrogen bond with the other hydrogen atom and can enhance solubility in organic solvent, compatibility with resin, dispersibility, and adhesion. The cyano group and the hydroxyphenyl group can enhance compatibility and solubility with polar resin and also can enhance heat resistance.

Among these substituents, an alkyl group, a hydroxy group, an ester group, and a cyano group are preferable.

Examples of the alkyl group include chain alkyl groups such as methyl, ethyl, propyl, butyl, isobutyl, t-butyl, pentyl, hexyl, octyl, decyl, and dodecyl; and cycloalkyl groups such as cyclopropyl, cyclopentyl, and cyclohexyl. Taking account of solubility in organic solvent, dispersibility with resin and steric hindrance, an alkyl group having 1 to 12 carbon atoms is more preferable.

Examples of the hydroxy group include hydroxy group linked directly to a main chain of a polyanion, or hydroxy group linked via the other functional group. Examples of the other functional group include alkyl group having 1 to 7 carbon atoms, alkenyl group having 2 to 7 carbon atoms, amide group, and imide group. The hydroxy group is substituted on the end of or in these functional groups. Among these groups, a hydroxy group linked to the end of an alkyl group having 1 to 6 carbon atoms linked to the main chain is preferable in view of compatibility with the resin and solubility in organic solvent.

Examples of the amino group include amino group linked directly to a main chain of a polyanion or amino group linked via a functional group. Examples of the other functional group include alkyl group having 1 to 7 carbon atoms, alkenyl group having 2 to 7 carbon atoms, amide group, and imide group. The amino group is substituted on the end of or in these functional groups.

Examples of the phenol group include phenol group linked directly to a main chain of a polyanion or phenol group linked via a functional group. Examples of the other functional group include alkyl group having 1 to 7 carbon atoms, alkenyl group having 2 to 7 carbon atoms, amide group, and imide group. The phenol group is substituted on the end of or in these functional groups.

Examples of the ester group include alkyl-based ester group linked directly to a main chain of a polyanion, aromatic ester group, alkyl-based ester group linked via the other functional group and aromatic ester group.

Examples of the cyano group include cyano group linked directly to a main chain of a polyanion, cyano group linked directly to an alkyl group having 1 to 7 carbon atoms linked to a main chain of a polyanion, and cyano group linked to the end of an alkenyl group having 2 to 7 carbon atoms linked to a main chain of a polyanion The anion group of the polyanion may be a functional group which can cause chemical oxidative doping in the π-conjugated conductive polymer. Among these groups, a monosubstituted sulfate ester group, a monosubstituted phosphate ester group, a phosphoric acid group, a carboxy group, and a sulfo group are preferable in view of ease of preparation and stability. In view of the effect of doping of a functional group to the π-conjugated conductive polymer, a sulfo group, a monosubstituted sulfate ester group and a carboxy group are more preferable.

Specific examples of the polyanion include polyvinylsulfonic acid, polystyrenesulfonic acid, polyallylsulfonic acid, polysulfoethyl acrylate, polysulfonbutyl acrylate, polysulfonic acrylate, polymethacrylsulfonic acid, poly-2-acrylamide-2-methylpropanesulfonic acid, polyisoprenesulfonic acid, polyvinylcarboxylic acid, polystyrenecarboxylic acid, polyallylcarboxylic acid, polyacrylcarboxylic acid, polymethacrylcarboxylic acid, poly-2-acrylamide-2-methylpropanecarboxylic acid, polyisoprenecarboxylic acid, and polyacrylic acid. A homopolymer of these polyanions may be used or a copolymer of two or more kinds of them may be used.

Among these polyanions, polystyrenesulfonic acid, polyisoprenesulfonic acid, polysulfoethyl acrylate, and polysulfobutyl acrylate are preferable. These polyanions can mitigate thermal decomposition of the π-conjugated conductive polymer.

The polymerization degree of the polyanion is preferably within a range from 10 to 100000 in terms of the number of monomer units, and is more preferably from 50 to 10000 in view of solvent solubility and conductivity.

Examples of the method for preparing a polyanion include a method of directly introducing an anion group into a polymer having no anion group using an acid, a method of converting a polymer having no anion group into sulfonic acid using a sulfonating agent and a method of preparing a polyanion by polymerizing an anion group-containing polymerizable monomer.

Examples of the method of preparing a polyanion by polymerizing an anion group-containing polymerizable monomer include a method of preparing a polyanion by oxidative polymerization or radical polymerization of an anion group-containing polymerizable monomer in a solvent in the presence of an oxidizing agent and/or polymerization catalyst. Specifically, a predetermined amount of anion group-containing polymerizable monomer is dissolved in a solvent and the solution is maintained at a fixed temperature, and then a solution prepared by previously dissolving a predetermined amount of an oxidizing agent and/or a polymerization catalyst in a solvent is added to the solution and the solution mixture is reacted for a predetermined time. The concentration of the polymer obtained by the reaction is adjusted to a fixed concentration using a solvent. In this method, an anion group-containing polymerizable monomer may be copolymerized with a polymerizable monomer having no anion group.

The oxidizing agent and the solvent used to polymerize the anion group-containing polymerizable monomer are the same as those used to polymerize a precursor monomer which forms the π-conjugated conductive polymer.

When the resulting polymer is a polyanion salt, it is preferably converted into polyanion acid. Examples of the method of converting into anion acid include ion exchange method using an ion-exchange resin, dialysis method and ultrafiltration method. Among these methods, an ultrafiltration method is preferable in view of ease of the operation.

The anion group-containing polymerizable monomer is a monomer, portion of which is substituted with a monosubstituted sulfate ester group, a carboxy group or a sulfo group, and examples thereof include substituted or unsubstituted ethylenesulfonic acid compound, substituted or unsubstituted styrenesulfonic acid compound, substituted or unsubstituted acrylate sulfonic acid compound, substituted or unsubstituted methacrylate sulfonic acid compound, substituted or unsubstituted acrylamide sulfonic acid compound, substituted or unsubstituted cyclovinylene sulfonic acid compound, substituted or unsubstituted butadiene sulfonic acid compound, substituted or unsubstituted vinyl aromatic sulfonic acid compound.

Specific examples thereof include vinylsulfonic acid and salts thereof, allylsulfonic acid and salts thereof, metallylsulfonic acid and salts thereof, styrenesulfonic acid, metallyloxybenzenesulfonic acid and salts thereof, allyloxybenzenesulfonic acid and salts thereof, α-methylstyrenesulfonic acid and salts thereof, acrylamide-t-butylsulfonic acid and salts thereof, 2-acrylamide-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, ethyl acrylate sulfonic acid ($CH_2CH-COO-(CH_2)_2-SO_3H$) and salts thereof, propyl acrylate propylsulfonic acid ($CH_2CH-COO-(CH_2)_3-SO_3H$) and salts thereof, acrylic acid-t-butylsulfonic acid ($CH_2CH-COO-C(CH_3)_2CH_2-SO_3H$) and salts thereof, acrylic acid-n-butylsulfonic acid ($CH_2CH-COO-(CH_2)_4-SO_3H$) and salts thereof, ethyl allylate sulfonic acid ($CH_2CHCH_2-COO-(CH_2)_2-SO_3H$) and salts thereof, allylic acid-t-butylsulfonic acid ($CH_2CHCH_2-COO-C(CH_3)_2CH_2-SO_3H$) and salts thereof, sulfoethyl 4-pentenoate ($CH_2CH(CH_2)_2-COO-(CH_2)_2-SO_3H$) and salts thereof, sulfopropyl 4-pentenoate ($CH_2CH(CH_2)_2-COO-(CH_2)_3-SO_3H$) and salts thereof, 4-pentenoic acid-n-butylsulfonic acid ($CH_2CH(CH_2)_2-COO-(CH_2)_4-SO_3H$) and salts thereof, 4-pentenoic acid-t-butylsulfonic acid ($CH_2CH(CH_2)_2-COO-C(CH_3)_2CH_2-SO_3H$) and salts thereof, sulfophenylene 4-pentenoate ($CH_2CH(CH_2)_2-COO-C_6H_4-SO_3H$) and salts thereof, sulfonaphthalene 4-pentenoate ($CH_2CH(CH_2)_2-COO-C_{10}H_8-SO_3H$) and salts thereof, sulfoethyl methacrylate ($CH_2C(CH_3)-COO-(CH_2)_2-SO_3H$) and salts thereof, sulfopropyl methacrylate ($CH_2C(CH_3)-COO-(CH_2)_3-SO_3H$) and salts thereof, methacrylic acid-t-butylsulfonic acid ($CH_2C(CH_3)-COO-C(CH_3)_2CH_2-SO_3H$) and salts thereof, methacrylic acid-n-butylsulfonic acid ($CH_2C(CH_3)$—COO—$(CH_2)_4$—$SO_3H$) and salts thereof, sulfophenylene methacrylate ($CH_2C(CH_3)$—COO—$C_6H_4$—$SO_3H$) and salts thereof, sulfonaphthalene methacrylate ($CH_2C(CH_3)$—COO—$C_{10}H_8$—$SO_3H$) and salts thereof, polyvinylcarboxylic acid, polystyrenecarboxylic acid, polyallylcarboxylic acid, polyacrylcarboxylic acid, polymethacrylcarboxylic acid, poly-2-acrylamide-2-methylpropanecarboxylic acid, polyisoprenecarboxylic acid, and polyacrylic acid. A copolymer of two or more kinds of them may be used.

Examples of the polymerizable monomer having no anion group include ethylene, propane, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylonitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, i-butyl acrylate, t-butyl acrylate, i-octyl acrylate, isononylbutyl acrylate, lauryl acrylate, allyl acrylate, benzyl acrylate, ethylcarbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, i-butyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinyl carbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, and 2-hydroxy-1,3-butadiene.

Solvent solubility can be controlled by copolymerizing a polymerizable monomer having no anion group.

Solvent solubility and compatibility with the hard coat component can be controlled by copolymerizing a polymerizable monomer having no anion group.

[Polymer Having Electron Attractive Group]

Examples of the polymer having an electron attractive group include polymers containing, as a constituent unit, a compound having at least one group selected from cyano group, nitro group, formyl group, carbonyl group, or acetyl group as an electron attractive group. Among these groups, a cyano group is preferable because it has high polarity and can solubilize the π-conjugated conductive polymer. It is preferable because compatibility with the hard coat component and dispersibility can be more enhanced.

Specific examples of the electron polymer having an electron attractive group include polyacrylonitrile, polymethacrylonitrile, acrylonitrile-styrene resin, acrylonitrile-butadiene resin, acrylonitrile-butadiene-styrene resin, resin obtained by cyanoethylating a hydroxyl group or amino group-containing resin (for example, cyanoethylcellulose), polyvinyl pyrrolidone, alkylated polyvinyl pyrrolidone, and nitrocellulose.

The content of the solubilizable polymer is preferably within a range from 0.1 to 10 mols, and more preferably from 1 to 7 mols, based on 1 mol of the π-conjugated conductive polymer. When the content of the solubilizable polymer is less than 0.1 mols, the effect of doping to the π-conjugated conductive polymer tends to be decreased and conductivity may be insufficient. On the other hand, when the content of the solubilizable polymer is more than 10 mols, the content of the π-conjugated conductive polymer decreases and sufficient conductivity is hardly obtained.

Synthetic rubbers for improving impact resistance as well as age resistors, antioxidants and ultraviolet absorber for improving environment-resistant characteristics may be added to the solubilizable polymer. Since an amine compound-based antioxidant may inhibit an action of the oxidizing agent used to polymerize the conductive polymer, it is necessary to use a phenol-based antioxidant or to mix after the polymerization.

The π-conjugated conductive polymer and the solubilizable polymer often form a complex through a chemical bond. Among the complexes, polystyrenesulfonic acid doped poly (3,4-ethylenedioxythiophene) (PSS-PEDOT) is preferable because high thermostability, low polymerization degree, and transparency after formation of the coating film are further enhanced.

(Dopant)

In the conductive polymer solution, the polyanion functions as a dopant of the π-conjugated conductive polymer and the conductive polymer solution may contain a dopant other than the polyanion (hereinafter referred to as the other dopant).

The other dopant may be a donative or acceptive dopant as far as it can oxidizes and reduces the π-conjugated conductive polymer.

[Donative Dopant]

Examples of the donative dopant include alkali metals such as sodium and potassium; alkali earth metals such as calcium and magnesium; and quaternary amine compounds such as tetramethylammonium, tetraethylammonium, tetrapropylammonium, tetrabutylammonium, methyltriethylammonium, and dimethyldiethylammonium.

[Acceptive Dopant]

As the acceptive dopant, for example, there can be used halogen compound, Lewis acid, proton acid, organic cyano compound, organometal compound, fullerene, hydrogenated fullerene, fullerene hydroxide, carboxylated fullerene, and sulfonated fullerene.

Examples of the halogen compound include chlorine ($Cl_2$), bromine ($Br_2$), iodine ($I_2$), iodide chloride (ICl), iodine bromide (IBr), and iodine fluoride (IF).

Examples of Lewis acid include $PF_5$, $AsF_5$, $SbF_5$, $BF_5$, $BCl_5$, $BBr_5$, and $SO_3$.

As the organic cyano compound, for example, a compound having at least two cyano groups in a conjugated bond can be used. Examples thereof include tetracyanoethylene, tetracyanoethylene oxide, tetracyanobenzene, dichlorodicyanobenzoquinone (DDQ), tetracyanoquinodimethane, and tetracyanoazanaphthalene.

Examples of the proton acid include inorganic acid and organic acid. Examples of the inorganic acid include hydrochloric acid, sulfuric acid, nitric acid, phosphoric acid, fluoroboric acid, hydrofluoric acid, and perchloric acid. Examples of the organic acid include organic carboxylic acid, phenols, and organic sulfonic acid.

As the organic carboxylic acid, for example, those having at least one or two carboxy groups in an aliphatic, aromatic or cyclic aliphatic can be used. Examples thereof include formic acid, acetic acid, oxalic acid, benzoic acid, phthalic acid, maleic acid, fumaric acid, malonic acid, tartaric acid, citric acid, lactic acid, succinic acid, monochloroacetic acid, dichloroacetic acid, trichloroacetic acid, trifluoroacetic acid, nitroacetic acid, and triphenylacetic acid.

As the organic sulfonic acid, for example, those having at least one or two sulfo groups in an aliphatic, aromatic or cyclic aliphatic, or a polymer having a sulfo group can be used.

Examples of the organic sulfonic acid having one sulfo group include methanesulfonic acid, ethanesulfonic acid, 1-propanesulfonic acid, 1-butanesulfonic acid, 1-hexanesulfonic acid, 1-heptanesulfonic acid, 1-octanesulfonic acid, 1-nonanesulfonic acid, 1-decanesulfonic acid, 1-dodecanesulfonic acid, 1-tetradecanesulfonic acid, 1-pentadecanesulfonic acid, 2-bromoethanesulfonic acid, 3-chloro-2-hydroxypropanesulfonic acid, trifluoromethanesulfonic acid, trifluoroethanesulfonic acid, colistinmethanesulfonic acid, 2-acrylamide-2-methylpropanesulfonic acid, aminomethanesulfonic acid, 1-amino-2-naphthol-4-sulfonic acid, 2-amino-5-naphthol-7-sulfonic acid, 3-aminopropanesulfonic acid, N-cyclohexyl-3-aminopropanesulfonic acid, benzenesulfonic acid, alkylbenzenesulfonic acid, p-toluenesulfonic acid, xylenesulfonic acid, ethylbenzenesulfonic acid, propylbenzenesulfonic acid, butylbenzenesulfonic acid, pentylbenzenesulfonic acid, hexylbenzenesulfonic acid, heptylbenzenesulfonic acid, octylbenzenesulfonic acid, nonylbenzenesulfonic acid, decylbenzenesulfonic acid, undecylbenzenesulfonic acid, dodecylbenzenesulfonic acid, pentadecylbenzenesulfonic acid, hexadecylbenzenesulfonic acid, 2,4-dimethylbenzenesulfonic acid, dipropylbenzenesulfonic acid, 4-aminobenzenesulfonic acid, o-aminobenzenesulfonic acid, m-aminobenzenesulfonic acid, 4-amino-2-chlorotoluene-5-sulfonic acid, 4-amino-3-methylbenzene-1-sulfonic acid, 4-amino-5-methoxy-2-methylbenzenesulfonic acid, 2-amino-5-methylbenzene-1-sulfonic acid, 4-amino-2-methylbenzene-1-sulfonic acid, 5-amino-2-methylbenzene-1-sulfonic acid, 4-amino-3-methylbenzene-1-sulfonic acid, 4-acetoamide-3-chlorobenzenesulfonic acid, 4-chloro-3-nitrobenzenesulfonic acid, p-chlorobenzenesulfonic acid, naphthalenesulfonic acid, methylnaphthalenesulfonic acid, propylnaphthalenesulfonic acid, butylnaphthalenesulfonic acid, pentylnaphthalenesulfonic acid, 4-amino-1-naphthalenesulfonic acid, 8-chloronaphthalene-1-sulfonic acid, naphthalenesulfonic acid formalin polycondensate, melaminesulfonic acid formalin polycondensate, anthraquinonesulfonic acid, and pyrenesulfonic acid. Metal salts of these organic sulfonic acids can also be used.

Examples of the organic sulfonic acid having at least two sulfo groups include ethanedisulfonic acid, butanedisulfonic acid, pentanedisulfonic acid, decanedisulfonic acid, o-benzenedisulfonic acid, m-benzenedisulfonic acid, p-benzenedisulfonic acid, toluenedisulfonic acid, xylenedisulfonic acid, chlorobenzenedisulfonic acid, fluorobenzenedisulfonic acid, dimethylbenzenedisulfonic acid, diethylbenzenedisulfonic acid, aniline-2,4-disulfonic acid, aniline-2,5-disulfonic acid, 3,4-dihydroxy-1,3-benzenedisulfonic acid, naphthalenedisulfonic acid, methylnaphthalenedisulfonic acid, ethylnaphthalenedisulfonic acid, pentadecylnaphthalenedisulfonic acid, 3-amino-5-hydroxy-2,7-naphthalenedisulfonic acid, 1-acetoamide-8-hydroxy-3,6-naphthalenedisulfonic acid, 2-amino-1,4-benzenedisulfonic acid, 1-amino-3,8-naphthalenedisulfonic acid, 3-amino-1,5-naphthalenedisulfonic acid, 8-amino-1-naphthol-3,6-disulfonic acid, 4-amino-5-naphthol-2,7-disulfonic acid, 4-acetoamide-4'-isothiocyanatostilbene-2,2'-disulfonic acid, 4-acetoamide-4'-isothio cyanotostilbene-2,2'-disulfonic acid, 4-acetoamide-4'-maleimidylstilbene-2,2'-disulfonic acid, naphthalenetrisulfonic acid, dinaphthylmethanedisulfonic acid, anthraquinonedisulfonic acid, and anthracenesulfonic acid. Metal salts of these organic sulfonic acids can also (Phase Transfer Catalyst)

The phase transfer catalyst is not specifically limited as far as it is coordinated to an anion group or an electron attractive group of the solubilizable polymer. As used herein, coordination refers to a bonding form in which, when the solubilizable polymer and a phase transfer catalyst donate/accept electrons with each other, their intermolecular distance is shortened.

Examples of the phase transfer catalyst include compound having a cation in the molecule and compound having a cation and an anion in the molecule. Specific examples thereof include ammonium derivatives, iminiums, diazoniums, cations of a noncyclic nitrogen skeleton, cations of a nitrogen-containing cyclic skeleton, nitrogen-containing resonance stabilized cations, and organic phosphonium salts.

More specific examples thereof include, but are not limited to, methyltrihexylammonium chloride, methyltrioctylammonium chloride, methyltridecylammonium chloride, methyltridodecylammonium chloride, dioctyldimethylammonium bromide, didecyldimethylammonium bromide, didodecyldimethylammonium bromide, tetrahexylammonium bromide, tetraoctylammonium bromide, tetradecylammonium bromide, tetradodecylammonium bromide, tetrabutylphosphonium bromide, tetraoctylphosphonium bromide, 2-trimethylsilylethyl-triphenylphosphonium chloride, 1-dodecyl-2-ethyl-3-ethylimidazolium chloride, 1-tetradecyl-2-ethyl-3-ethylimidazolium chloride, 1-hexadecyl-2-ethyl-3-ethylimidazolium chloride, 1-dodecyl-2-methyl-3-benzylimidazolium chloride, 1-tetradecyl-2-methyl-3-benzylimidazolium chloride, 1-hexadecyl-2-methyl-3-benzylimidazolium chloride, 1-octadecyl-2-methyl-3-benzylimidazolium chloride, 1-ethyl-3-methylimidazolium chloride, 1-butyl-3-methylimidazolium chloride, 1-butyl-3-methylimidazolium tetrafluoroborate, 1-butyl-3-methylimidazolium trifluoromethanesulfonate, 1-hexyl-3-methylimidazolium chloride, 1-octyl-3-methylimidazolium chloride, methylpyridinium chloride, ethylpyridinium chloride, propylpyridinium chloride, butylpyridinium chloride, hexylpyridinium chloride, octylpyridinium chloride, decylpyridinium chloride, dodecylpyridinium chloride, and hexadodecylpyridinium chloride.

The content of the phase transfer catalyst is preferably within a range from 0.1 to 10 molar equivalents, more preferably from 0.5 to 2.0 molar equivalents, and particularly preferably from 0.85 to 1.25 molar equivalents, based on anion groups and electron attractive groups of the solubilizable polymer which does not contribute to doping of the π-conjugated conductive polymer. When the content of the phase transfer catalyst is not more than the lower limit, since the phase transfer catalyst is coordinated to almost all of anion groups and electron attractive groups of the solubilizable polymer, solubility in organic solvent is more enhanced. On the other hand, when the content of the phase transfer catalyst is more than the upper limit, since excess phase transfer catalyst is not contained in the conductive polymer solution, deterioration of performances of conductivity can be prevented.

(Organic Solvent)

The organic solvent contained in the conductive polymer solution is not specifically limited as far as it is a solvent other than water, and examples thereof include methanol, ethanol, propylene carbonate, N-methylpyrrolidone, dimethylformamide, dimethylacetamide, cyclohexanone, acetone, methyl ethyl ketone, methyl isobutyl ketone, and toluene. These organic solvents may be used alone or in combination.

Examples of the organic solvent contained in the antistatic coating material include methanol, ethanol, isopropanol, propylene carbonate, N-methylpyrrolidone, dimethylformamide, dimethylacetamide, cyclohexanone, acetone, methyl ethyl ketone, methyl isobutyl ketone, and toluene. These organic solvents may be used alone or in combination.

Among these solvents, an organic solvent, which is other than water and has a boiling point lower than that of water, is preferable because the drying rate increases even in the organic solvent.

The antistatic tacky adhesive may contain the organic solvent. Examples of the organic solvent include methanol, ethanol, isopropanol, propylene carbonate, N-methyl pyrrolidone, dimethylformamide, dimethylacetamide, cyclohexanone, acetone, methyl ethyl ketone (MEK), methyl isobutyl ketone, and toluene. These organic solvents may be used alone or in combination.

Among these solvents, an organic solvent having a boiling point lower than that of water is preferable because the drying rate increases even in the organic solvent.

When the tacky adhesive component is liquid, the organic solvent is not required necessarily and the antistatic tacky adhesive may be free from a solvent.

(Binder Resin)

The conductive polymer solution preferably contains a binder resin because scratch resistance and surface hardness of the coating film are enhanced and adhesion to the base material is improved.

The binder resin may be a thermosetting resin or a thermoplastic resin. Examples thereof include polyesters such as polyethylene terephthalate, polybutylene terephthalate, and polyethylene naphthalate; polyimides such as polyimide, and polyamideimide; polyamides such as polyamide 6, polyamide 6,6, polyamide 12, and polyamide 11; fluorine resins such as polyvinylidene fluoride, polyvinyl fluoride, polytetrafluoroethylene, ethylene-tetrafluoroethylene copolymer, and polychlorotrifluoroethylene; vinyl resins such as polyvinyl alcohol, polyvinyl ether, polyvinyl butyral, vinyl polyacetate, and polyvinyl chloride; epoxy resins; oxetane resins; xylene resins; aramid resins; polyimide silicones; polyurethanes; polyureas; melamine resins; phenol resins; polyethers; acrylic resins; and copolymers thereof.

These binder resins may be dissolved in the organic solvent, converted into an aqueous solution by providing with a functional group such as sulfo group or carboxy group, or dispersed in water by emulsification.

Among these binder resins, at least one of polyurethanes, polyesters, acrylic resins, polyamides, polyimides, epoxy resins, polyimide silicones, and melamine resins is preferable because it can be easily mixed.

The binder resin preferably contains a liquid polymer which is cured by thermal energy and/or optical energy.

Examples of the liquid polymer which is cured by thermal energy include reactive polymer and self-crosslinking polymer.

The reactive polymer is a polymer obtained by polymerizing a monomer having a substituent, and examples of the substituent include hydroxy group, carboxy group, acid anhydride group, oxetane group, glycidyl group, and amino group. Specific examples of the monomer include polyfunctional alcohols such as ethylene glycol, diethylene glycol, dipropylene glycol, and glycerin; carboxylic acid compounds such as malonic acid, succinic acid, glutamic acid, pimelic acid, ascorbic acid, phthalic acid, acetylsalicylic acid, adipic acid, isophthalic acid, benzoic acid, and m-toluic acid; acid anhydrides such as maleic anhydride, phthalic anhydride, dodecylsuccinic anhydride, dichloromaleic anhydride, tetrachlorophthalic anhydride, tetrahydrophthalic anhydride, and pyromellitic anhydride; oxetane compounds such as 3,3-dimethyloxetane, 3,3-dichloromethyloxetane, 3-methyl-3-hydroxymethyloxetane, and azidemethylmethyloxetane; glycidyl ether compounds such as bisphenol A diglycidyl ether, bisphenol F diglycidyl ether, phenolnovolak polyglycidyl ether, N,N-diglycidyl-p-aminophenol glycidyl ether, tetrabromobisphenol A diglycidyl ether, and hydrogenated bisphenol A diglycidyl ether (that is, 2,2-bis(4-glycidyloxycyclohexyl)propane); glycidylamine compounds such as N,N-diglycidyl aniline, tetraglycidyl diaminodiphenylmethane, N,N,N,N-tetraglycidyl-m-xylenediamine, triglycidyl isocyanurate, and N,N-diglycidyl-5,5-dialkylhydantoin; amine compounds such as diethylenetriamine, triethylenetetramine, dimethylaminopropylamine, N-aminoethylpiperazine benzyldimethylamine, tris(dimethylaminomethyl)phenol, DHP30-tri(2-ethylhexoate), metaphenylenediamine, diaminodiphenylmethane, diaminodiphenylsulfone, dicyandiamide, boron trifluoride, monoethylamine, methanediamine, xylenediamine, and ethylmethylimidazole; and glycidyl compounds such as epichlorohydrin of bisphenol A among compounds containing at least two oxirans in the molecule, or analogues thereof.

In the reactive polymer, a di- or polyfunctional crosslinking agent is used. Examples of the crosslinking agent include melamine resin, epoxy resin, and metal oxide. As the metal oxide, basic metal compounds such as $Al(OH)_3$, $Al(OOC.CH_3)_2(OOCH)$, $Al(OOC.CH_3)_2$, $ZrO(OCH_3)$, $Mg(OOC.CH_3)$, $Ca(OH)_2$, and $Ba(OH)_3$ can be appropriately used.

The self-crosslinking polymer is a polymer whose functional groups are self-crosslinked with each other by heating, and examples thereof include those having a glycidyl group and a carboxy group or those having both N-methylol and a carboxy group.

Examples of the liquid polymer cured by optical energy include oligomers or prepolymers such as polyester, epoxy resin, oxetane resin, polyacryl, polyurethane, polyimide, polyamide, polyamideimide, and polyimidesilicone.

Examples of the monomer unit constituting the liquid polymer which is cured by optical energy include acrylates such as bisphenol A ethylene oxide-modified diacrylate, dipentaerythritol hexa(penta)acrylate, dipentaerythritol monohydroxypentaacrylate, dipropylene glycol diacrylate, trimethylolpropane triacrylate, glycerin propoxytriacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylolpropane triacrylate, and tripropylene glycol diacrylate; methacrylates such as tetraethylene glycol dimethacrylate, alkyl methacrylate, allyl methacrylate, 1,3-butylene glycol dimethacrylate, n-butyl methacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, t-butyl methacrylate, tetrahydrofurfuryl methacrylate, and trimethylolpropane trimethacrylate; glycidyl ethers such as allyl glycidyl ether, butyl glycidyl ether, higher alcohol glycidyl ether, 1,6-hexanediol glycidyl ether, phenyl glycidyl ether, and stearyl glycidyl ether; acryl(methacryl)amides such as diacetoneacrylamide, N,N-dimethylacrylamide, dimethylaminopropylacrylamide, dimethylaminopropylmethacrylamide, methacrylamide, N-methylolacrylamide, N,N-dimethylacrylamide, acryloylmorpholine, N-vinylformamide, N-methylacrylamide, N-isopropylacrylamide, N-t- butylacrylamide, N-phenylacrylamide, acryloylpiperidine, and 2-hydroxyethylacrylamide; vinyl ethers such as -chloroethyl vinyl ether, cyclohexyl vinyl ether, ethyl vinyl ether, hydroxybutyl vinyl ether, isobutyl vinyl ether, and triethylene glycol vinyl ether; and monofunctional monomers and polyfunctional monomers of vinyl carboxylate esters such as vinyl butyrate, vinyl monochloroacetate, and vinyl pivalate.

The liquid polymer cured by optical energy is cured by a photopolymerization initiator. Examples of the photopolymerization initiator include acetophenones, benzophenones, Michler's benzoyl benzoate, α-amyloxime ester, tetramethylthiuram monosulfide, and thioxanthones. It is also possible to mix with photosensitizers such as n-butylamine, triethylamine, and tri-n-butyl phosphine.

Examples of the cationic polymerization initiator include aryldiazonium salts, diarylhalonium salts, triphenylsulfonium salts, silanol/aluminum chelate, and α-sulfonyl oxyketones.

Since the phase transfer catalyst is coordinated to the anion group or the electron attractive group of the solubilizable polymer and oil solubility of the solubilizable polymer is enhanced, the π-conjugated conductive polymer, which formed a complex with the solubilizable polymer, is dissolved in the organic solvent in the above conductive polymer solution. The π-conjugated conductive polymer is oil soluble and is therefore compatible with the hydrophobic resin.

A conductive coating film can be formed by coating this conductive polymer solution onto various base materials. In that case, by using an organic solvent having a low boiling point, the drying rate can be increased and productivity of the conductive coating film can be enhanced. Moreover, the conductive coating film formed of the conductive polymer solution has sufficient conductivity.

(Hard Coat Component)

The hard coat component may be a thermosetting resin or a thermoplastic resin.

Examples of the hard coat component include polyesters such as polyethylene terephthalate, polybutylene terephthalate, and polyethylene naphthalate; polyimides such as polyimide and polyamideimide; polyamides such as polyamide 6, polyamide 6,6, polyamide 12, and polyamide 11; fluorine resins such as polyvinylidene fluoride, polyvinyl fluoride, polytetrafluoroethylene, ethylene tetrafluoroethylene copolymer, and polychlorotrifluoroethylene; vinyl resins such as polyvinyl alcohol, polyvinyl ether, polyvinyl butyral, polyvinyl acetate, and polyvinyl chloride; epoxy resins; oxetane resins; xylene resins; aramid resins; polyimide silicones; polyurethanes; polyureas; melamine resins; phenol resins; polyethers; acrylic resins; and copolymers thereof.

These hard coat components may be dissolved in the organic solvent, converted into an aqueous solution by providing with a functional group such as sulfo group or carboxy group, or dispersed in water by emulsification.

If necessary curing agents such as crosslinking agent and polymerization initiator, polymerization accelerators, solvents, and viscosity adjustors can be added to the hard coat component before use.

Among hard coat components, at least one of polyurethane, polyester, acrylic resin, polyamide, polyimide, epoxy resin, and polyimide silicone is preferable because it can be easily mixed. The acrylic resin has high hardness and is also excellent in transparency and is therefore suited for use in an optical filter.

The hard coat component preferably contains a liquid polymer which is cured by thermal energy and/or optical energy.

Examples of the liquid polymer which is cured by thermal energy include reactive polymer and self-crosslinking polymer.

As the reactive polymer and the self-crosslinking polymer, the same polymers as those described for the above Binder resin can be used.

Also, the liquid polymer which is cured by optical energy, the monomer unit constituting the liquid polymer which is cured by optical energy, and photopolymerization initiator which cures the liquid polymer are the same ones as those described for the above Binder resin can be used.

The above hard coat component also exerts a function as a binder resin used to enhance adhesion with the below described base material onto which the antistatic coating material is coated.

(Nitrogen-Containing Compound)

The nitrogen-containing compound is a compound which has at least one nitrogen-containing functional group selected from urea group, urethane group, biuret group, imide group or amide group, the nitrogen-containing functional group being quaternized.

The nitrogen-containing compound is obtained by quaternizing the compound having at least one nitrogen-containing functional group selected from urea group, urethane group, biuret group, imide group or amide group.

[Compound Having Urea Group, Urethane Group, and Biuret Group]

Examples of the compound having a urea group include polyurea acrylate. Examples of the compound having a urethane group include urethane acrylate. Examples of the compound having a biuret group include a (meth)acryloyl group-containing compound having a biuret bond.

The compound having a urea group can be obtained by the addition reaction of a compound having an isocyanate group and a compound having an amino group.

The compound having a urethane group is obtained by the addition reaction of a compound having an isocyanate group and a compound having a hydroxy group or a carboxy group.

The compound having a biuret group is obtained by the addition reaction of the compound having a urea group and a compound having an isocyanate group.

Also, the compound may be a compound by the addition reaction of the compound having a urethane group and a compound having an isocyanate group.

Examples of the compound having an isocyanate group used to obtain the compound having a urea group, a urethane group, and a biuret group include diisocyanates, for example, aromatic diisocyanates such as 2,4-tolylene diisocyanate, 2,6-tolylene diisocyanate, xylene-1,4-diisocyanate, xylene-1,3-diisocyanate, 4,4'-diphenylmethane diisocyanate (MDI), 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxydiphenyl-4,4'-diisocyanate; aliphatic diisocyanates such as tetramethylene diisocyanate, hexamethylene diisocyanate (HDI), and lysine diisocyanate; and alicyclic diisocyanates such as isophorone diisocyanate, hydrogenated tolylene diisocyanate, hydrogenated xylene diisocyanate, hydrogenated diphenylmethane diisocyanate, and tetramethylxylene diisocyanate.

Examples of the compound having an amino group used to form the compound having a urea group include diamine and aminoalcohol. Examples of the diamine include ethylenediamine, propylenediamine, butylenediamine, hexamethylenediamine, xylidenediamine, phenylenediamine, and 4,4'-diaminodiphenylmethane. There can also be used diamines in a broad sense, for example, hydrazine and dihydrazide of dicarboxylic acid (for example, oxalic acid dihydrazide, succinic acid dihydrazide, adipic acid dihydrazide, sebacic acid dihydrazide, and isophthalic acid dihydrazide). Examples of the aminoalcohol include methanolamine, 2-aminoethanol, 3-aminopropanol, and 4-aminobutanol.

Examples of the compound having a hydroxy group include diol, aminoalcohol, and high molecular weight polyol.

Examples of the diol include ethylene glycol, propylene glycol, tetramethylene glycol, 1,5-pentanediol, 1,6-hexanediol, 1,10-decanediol, 1,4-dihydroxycyclohexane, 1,4-dihydroxymethylcyclohexane, diethylene glycol, and triethylene glycol.

Examples of the aminoalcohol include those listed in the compound having an amino group.

Examples of the high molecular weight polyol compound include polyesterpolyol, polycarbonatepolyol, and polyetherpolyol.

Examples of the polyesterpolyol include polyester polyols and polyesteramidepolyols which are obtained by the dehydrocodensation reaction of dicarboxylic acids, acid esters, and acid anhydrides such as succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, naphthalenedicarboxylic acid, or acid ester or acid anhydride thereof, glycols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, 1,4-cyclohexane dimethanol, or ethylene oxide of bisphenol A or propylene oxide adduct, and diamines or aminoalcohols such as hexamethylenediamine, xylenediamine, isophoronediamine, and monoethanolamine alone or mixtures thereof, and lactone-based polyesterpolyols obtained by ring-opening polymerization of cyclic ester(lactone) monomers, such as olyesteramidepolyol and epsilon-caprolactone.

Examples of the polycarbonatepolyol include those obtained by the dealcoholization reaction of a polyhydric alcohol and diethylene carbonate, dimethyl carbonate, diethyl carbonate or diphenyl carbonate. Examples of the polyhydric alcohol include polycarbonate polyols obtained by using ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, and 1,4-cyclohexane dimethanol alone or in combination.

Examples of the polyetherpolyol include polyethylene glycol, polypropylene glycol, polytetramethylene ether glycol obtained by ring-opening polymerization of ethylene oxide, propylene oxide, and tetrahydrofuran, copolyethers obtained by copolymerizing them, and esterethers obtained by using the above polyesters and polycarbonate polyol as an initiator.

Examples of the compound having a carboxy group include dicarboxylic acid, acid ester, and acid anhydride.

Examples of the dicarboxylic acid include succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, and naphthalenedicarboxylic acid. Examples of the acid ester include esters of the above dicarboxylic acids. Examples of the acid anhydride include acid anhydrides of the above dicarboxylic acids. Acid esters and acid anhydrides thereof are further exemplified.

The compound having a urea group, a urethane group, and a biuret group can be prepared by uniformly mixing and reacting the above components in a molten or bulky state under the temperature conditions where ring opening of a uretdione group do not occur, preferably at 100° C. or lower. If necessary, inert solvents can be added. Examples of the inert solvent include aromatic hydrocarbon-based solvents such as toluene and xylene; ester-based solvents such as ethyl acetate and butyl acetate; ketone-based solvents such as methyl ethyl ketone and cyclohexanone; glycol ether ester-based solvents such as ethylene glycol ethyl ether acetate, propylene glycol methyl ether acetate, and ethyl-3-ethoxypropionate; ether-based solvents such as tetrahydrofuran and dioxane; and polar solvents such as dimethylformamide, dimethylacetone, N-methylpyrrolidone and furfural, and these solvents can be used alone or in combination.

The reactor is not specifically limited as far as it can perform the above reaction, and examples thereof include mixing and kneading apparatuses such as reaction vessel equipped with a stirrer, kneader, and mono- or polyaxial extrusion reactors.

In case of forming the compound having a urea group, a urethane group, and a biuret group, chain extenders may be added. The chain extender is a substance which has a molecular weight of 300 or less and at least two active hydrogens in the molecule, and known alcohol, amine and aminoalcohol are used. Specific examples thereof include glycols such as ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, trimethylolpropane, glycerin, diethylene glycol, 1,4-cyclohexane dimethanol, bishydroxyethoxybenzene, ethylene oxide of bisphenol A, and propylene oxide adduct; and diamines or aminoalcohols such as hexamethylenediamine, xylenediamine, isophoronediamine, methylenebis(orthochloroaniline), and monoethanolamine. Also water and urea can be used as the chain extender.

In case of forming the compound having a urea group, a urethane group, a biuret group, an imide group, and an amide group, catalysts may be used. Examples of the catalyst include tertiary amines such as triethylamine and triethylenediamine; metal salts such as potassium acetate and zinc stearate; and organometal compounds such as dibutyltin laurate, and dibutyltin oxide.

The nitrogen-containing compound preferably has at least one unsaturated double bond because thermostability, film forming properties and abrasion resistance the coating film formed of the conductive polymer solution are enhanced and conductivity is more enhanced. In case the nitrogen-containing compound is a quaternized material of the compound having a urea group, a urethane group, and a biuret group, an unsaturated double bond is preferably introduced into the compound having a urea group, a urethane group, and a biuret group. Examples of the method of introducing an unsaturated double bond into the compound having a urea group, a urethane group, and a biuret group include a method of reacting a compound having an isocyanate group at a molecular end with an acrylate ester-based monomer having a hydroxyl group.

Examples of the acrylate ester-based monomer having a hydroxyl group include 2-hydroxyethyl acrylate, 2-hydroxyethyl methacrylate, 2-hydroxypropyl acrylate, glycidol dimethacrylate, and pentaerythritol triacrylate.

[Compound Having Imide Group]

Examples of the compound having an imide group include polyimide. The polyimide is obtained by the condensation reaction of an acid anhydride and diamine.

Examples of the acid anhydride include pyromellitic acid dianhydride, biphenyltetracarboxylic acid dianhydride, benzophenonetetracarboxylic acid dianhydride, 2,2,3,3-tetracarboxydiphenylether dianhydride, and 2,2-[4,4'-di(dicarboxyphenyloxy)phenyl]propane dianhydride.

Examples of the diamine include oxydiamine, paraphenylenediamine, metaphenylenediamine, and benzophenonediamine.

To introduce an unsaturated double bond into polyimide, the condensation reaction of an acid anhydride unit at the end and an isocyanate group-containing unsaturated monomer may be conducted.

Examples of the isocyanate group-containing unsaturated monomer include vinyl isocyanate, allyl isocyanate, 2-methacryloyloxyethyl isocyanate, and 2-acryloyloxyethyl isocyanate.

[Compound Having Amide Group]

Examples of the compound having an amide group include acrylamide-based resin and polyamide.

The acrylamide-based resin is a (co)polymer containing an amide group-containing monomer as a constituent unit. Examples of the amide group-containing monomer include acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide, N-phenylacrylamide, N-(2-hydroxyethyl)acrylamide, and N-methyl(2-hydroxyethyl)acrylamide.

The acrylamide-based resin may contain, as the constituent unit, copolymer components, for example, acrylate ester (examples of the alcohol residue include methyl group, ethyl group, n-propyl group, isopropyl group, n-butyl group, isobutyl group, t-butyl group, 2-ethylhexyl group, cyclohexyl group, phenyl group, benzyl group, and phenylethyl group); methacrylate ester (alcohol residue is as defined above); hydroxy group-containing monomer such as 2-hydroxyethyl acrylate, 2-hydroxyethyl methacrylate, 2-hydroxypropyl acrylate or 2-hydroxypropyl methacrylate; amino group-containing monomer such as N,N-diethylaminoethyl acrylate or N,N-diethylaminoethyl methacrylate; glycidyl group-containing monomer such as glycidyl acrylate, glycidyl methacrylate or allyl glycidyl ether.

Examples of the method of introducing an unsaturated double bond into an acrylamide-based resin include a method of the addition reaction of active hydrogen formed from a hydroxy group-containing monomer, an amino group-containing monomer or a glycidyl group-containing monomer, and an isocyanate group-containing unsaturated monomer such as vinyl isocyanate, allyl isocyanate, 2-methacryloyloxyethyl isocyanate or 2-acryloyloxyethyl isocyanate, and a method of the condensation reaction of a carboxy group-containing monomer and a glycidyl group-containing monomer.

The polyamide is obtained by the condensation reaction of a dicarboxylic acid and diamine.

Examples of the dicarboxylic acid include succinic acid, adipic acid, sebacic acid, azelaic acid, terephthalic acid, isophthalic acid, orthophthalic acid, hexahydroterephthalic acid, hexahydroisophthalic acid, hexahydroorthophthalic acid, and naphthalenedicarboxylic acid.

Examples of the diamine include oxydiamine, paraphenylenediamine, metaphenylenediamine, and benzophenonediamine.

To introduce an unsaturated double bond into the polyamide, the condensation reaction of an acid anhydride unit at the end and an isocyanate group-containing unsaturated monomer may be conducted. Examples of the isocyanate group-containing unsaturated monomer include vinyl isocyanate, allyl isocyanate, 2-methacryloyloxyethyl isocyanate, and 2-acryloyloxyethyl isocyanate.

[Quaternization of the Nitrogen Atom]

Quaternization of a compound having a urea group, an amide group, a urethane group, a biuret group, an imide group, and an amide group can be conducted by reacting with an inorganic acid such as hydrogen chloride, hydrogen bromide, acetic acid, lactic acid or sulfuric acid, and a quaternizing agent such as benzyl chloride, benzyl bromide, methyl chloride, methyl bromide, dimethylsulfuric acid, diethylsulfuric acid, dipropylsulfuric acid, methyl p-toluene sulfonate, methyl benzene sulfonate, trimethyl phosphate or epichlorohydrin.

The quaternization rate of the nitrogen atom is preferably from 0.1 to 100%, and more preferably from 2 to 100%. When the quaternization rate is 0.1% or less, a large amount of a nitrogen-containing compound must be added so as to form a salt with an anion group, which does not contribute to doping, in a complex of the $\pi$-conjugated conductive polymer and a polyanion, and thus conductivity may be lowered.

The molecular weight of the nitrogen-containing compound is preferably from 500 to 60,000, and more preferably from 1,000 to 30,000, in view of workability.

The content of the nitrogen-containing compound is preferably from 0.1 to 100 molar equivalents, and more preferably from 2 to 50 molar equivalents, based on the polyanion. When the content of the nitrogen-containing compound exceed 100 molar equivalents based on the polyanion, conductivity may be lowered because of the excess nitrogen-containing compound. When the content is less than 0.1 molar equivalents based on the polyanion, it tends to become difficult to improve conductivity, thermostability, film forming properties, abrasion resistance, and adhesion to base material.

(Polyfunctional Monomer)

A polyfunctional monomer may be added to the conductive polymer solution so as to further improve thermostability, film forming properties, and abrasion resistance of the coating film. As the polyfunctional monomer, for example, (meth)acrylate ester and (meth)acrylamide can be used. Examples of the (meth)acrylate ester include (meth)acrylate esters of polyols, such as diethylene glycol di(meth)acrylate, triethylene glycol di(meth)acrylate, tetraethylene glycol di(meth)acrylate, nonamethylene glycol di(meth)acrylate, tetradecaethylene glycol di(meth)acrylate, nonapropylene glycol di(meth)acrylate, dodecapropylene glycol di(meth)acrylate, trimethylolpropane tri(meth)acrylate, tri(meth)acrylate of an ethylene oxide adduct of trimethylolpropane, pentaerythritol di(meth)acrylate, pentaerythritol tri(meth)acrylate, pentaerythritol tetra(meth)acrylate, dipentaerythritol hexa(meth)acrylate, glycerin di(meth)acrylate, and 1,3-propanediol di(meth)acrylate.

Examples of (meth)acrylamides include, in addition to methylenebis(meth)acrylamide, ethylenediamine, diaminopropane, diaminobutane, pentamethylenediamine, bis(2-aminopropyl)amine, diethylenetriaminediamine, phenylenediamine, and poly(meth)acrylamide derived from diaminobenzoic acid.

(Additive)

If necessary, the conductive polymer solution can also contain additives such as silane coupling agents, antioxidants, ultraviolet absorbers, leveling agents, and flame retardants.

(Tacky Adhesive Component)

The tacky adhesive component is a component which exhibits tackiness or adhesiveness and it itself may have tackiness or adhesiveness, or may exhibit tackiness or adhesiveness after heating. Tacking means removable sticking, whereas, adhesion means irremovable sticking.

Specific examples of the tacky adhesive component include monomers or polymers such as acrylic compounds, urethane-based compounds, epoxy-based compounds, ester-based compounds, amide-based compounds, urea-based compounds, rubber-based compounds, silicone-based compounds, melamine-based compounds, carbodiimide-based compounds, oxazolidine-based compounds, and cellulose-based compounds. These tacky adhesive components may be used alone or in combination.

Among these tacky adhesive components, acrylic compounds are preferable and acryl monomers and/or acrylic polymers are more preferable in view of transparency.

Examples of the acryl monomer include a monomolecular compound obtained by reacting (meth)acrylic acid and (meth)acrylic acid and a primary alcohol or a primary amine. Specific examples of the acryl monomer include acrylates such as acrylic acid, methyl acrylate, butyl acrylate, isobutyl acrylate, 2-methoxyethyl acrylate, ditrimethylolpropane tetraacrylate, 2-hydroxy-3-phenoxypropylacrylate, bisphenol A ethylene oxide-modified diacrylate, dipentaerythritol pentaacrylate, dipentaerythritol hexaacrylate, dipentaerythritol monohydroxypentaacrylate, dipropylene glycol diacrylate, trimethylolpropane triacrylate, glycerin propoxytriacrylate, 4-hydroxybutyl acrylate, 1,6-hexanediol diacrylate, 2-hydroxyethyl acrylate, 2-hydroxypropyl acrylate, isobornyl acrylate, polyethylene glycol diacrylate, pentaerythritol triacrylate, tetrahydrofurfuryl acrylate, trimethylol propanetriacrylate, and tripropylene glycol diacrylate; methacrylates such as tetraethylene glycol dimethacrylate, methyl methacrylate, ethyl methacrylate, n-butyl methacrylate, t-butyl methacrylate, allyl methacrylate, 1,3-butylene glycol dimethacrylate, benzyl methacrylate, cyclohexyl methacrylate, diethylene glycol dimethacrylate, 2-ethylhexyl methacrylate, glycidyl methacrylate, 1,6-hexanediol dimethacrylate, 2-hydroxyethyl methacrylate, isobornyl methacrylate, lauryl methacrylate, phenoxyethyl methacrylate, tetrahydrofurfuryl methacrylate, and trimethylolpropane trimethacrylate; glycidyl ethers such as allyl glycidyl ether, butyl glycidyl ether, higher alcohol glycidyl ether, 1,6-hexanediol glycidyl ether, phenyl glycidyl ether, and stearyl glycidyl ether; (meth) acrylamides such as diacetoneacrylamide, N,N-dimethylacrylamide, dimethylaminopropylacrylamide, dimethylaminopropylmethacrylamide, methacrylamide, N-methylolacrylamide, acryloylmorpholine, N-methylacrylamide, N-isopropylacrylamide, N-t-butylacrylamide, N-phenylacrylamide, acryloylpiperidine, and 2-hydroxyethylacrylamide; vinyl ethers such as N-vinylformamide, 2-chloroethyl vinyl ether, cyclohexyl vinyl ether, ethyl vinyl ether, hydroxybutyl vinyl ether, isobutyl vinyl ether, and triethylene glycol vinyl ether; and vinyl carboxylate esters such as vinyl butyrate, vinyl monochloroacetate, vinyl pivalate, vinyl acetate, and vinyl propionate.

Since the acryl monomer is liquid, when the acryl monomer is contained as a tacky adhesive component, an antistatic tacky adhesive can be a solvent free tacky adhesive which does not contain an organic solvent.

(Acrylic Polymer)

The acrylic polymer is a homopolymer or copolymer which contains at least one acryl monomer unit as a constituent component. In case of the copolymer, a comonomer is not specifically limited and examples thereof include carboxylic acid monomers having a double bond such as maleic acid, fumaric acid, and itaconic acid, or an anhydride thereof, (meth)acrylonitrile, N-vinyl pyrrolidone, N-vinyl caprolactam, and styrene.

When a cohesive force is required to the tacky adhesive layer, an acrylic polymer is preferably crosslinked by a crosslinking agent. Examples of the crosslinking agent include isocyanate-based crosslinking agents, epoxy-based crosslinking agents, aziridine-based crosslinking agents, and metal-based crosslinking agents.

When the tacky adhesive component is a monomer, tacky adhesiveness, and adhesion to the base material can be easily controlled, and therefore polymerization initiators are preferably added to the antistatic tacky adhesive. Examples of the polymerization initiator include acetophenones, benzophenones, Michler's benzoyl benzoate, α-amyloxime ester, tetramethylthiuram monosulfide, and thioxanthones. It is possible to mix with photosensitizers such as n-butylamine, triethylamine and tri-n-butylphosphine.

Examples of the cationic polymerization initiator include aryldiazonium salts, diarylhalonium salts, triphenylsulfonium salts, silanol/aluminum chelate, and α-sulfonyl oxyketones.

The antistatic tacky adhesive of the present invention may contain fillers. When fillers are contained, tacky adhesiveness can be easily controlled and blocking of protective material can be prevented. Examples of the filler include porous materials such as graphite; silicon-containing compounds such as glass beads; inorganic compounds such as calcium carbonate and inorganic phosphorus compounds; and spherical plastic.

<Method for Preparing Conductive Polymer Solution>

The first method for preparing a conductive polymer solution of the present invention is a liquid-liquid extraction method comprising adding a phase transfer catalyst after adding an organic solvent to an aqueous polymer solution prepared by dissolving the π-conjugated conductive polymer and the solubilizable polymer in water. In an example, first, an organic solvent is added to an aqueous solution of a complex of the π-conjugated conductive polymer and the solubilizable polymer, and then a phase transfer catalyst is added, followed by stirring or shaking. After standing for a while, the resulting solution is separated into an aqueous layer and an organic solvent layer and the aqueous layer is removed to obtain a conductive polymer solution in which a complex of the π-conjugated conductive polymer and the solubilizable polymer are dissolved in an organic solvent.

The aqueous polymer solution is prepared in the following manner. First, the solubilizable polymer is dissolved in a solvent which dissolves the polymer and then a precursor monomer of the π-conjugated conductive polymer and, if necessary, a dopant are added, followed by fully mixing and stirring. To the mixture thus obtained, an oxidizing agent is added, thereby allowing the polymerization to proceed to obtain a complex of the π-conjugated conductive polymer and the solubilizable polymer. Then, the complex is purified by removing the oxidizing agent, the residual monomer and by-products.

The second method for preparing a conductive polymer solution of the present invention is a method comprising adding a phase transfer catalyst to an aqueous polymer solution prepared by dissolving the π-conjugated conductive polymer and the solubilizable polymer in water, separating a mixture containing the π-conjugated conductive polymer, the solubilizable polymer, and the phase transfer catalyst from water and adding an organic solvent to the mixture. In an example of this method, first, a phase transfer catalyst is added to an aqueous solution of a complex of the π-conjugated conductive polymer and the solubilizable polymer, thereby precipitating a mixture containing the π-conjugated conductive polymer, the solubilizable polymer, and the phase transfer catalyst, and then the resulting mixture is collected. Then, the mixture is dissolved in an organic solvent to obtain a conductive polymer solution in which a complex of the π-conjugated conductive polymer and the solubilizable polymer is dissolved in the organic solvent.

In the above method for preparing a conductive polymer solution, since the π-conjugated conductive polymer and the solubilizable polymer are converted into an aqueous solution and then the phase transfer catalyst is added to the aqueous solution, it is possible to make the π-conjugated conductive polymer, which was insoluble in the organic solvent, to be oil soluble. Therefore, by mixing the organic solvent, it is possible to obtain a conductive polymer solution in which the π-conjugated conductive polymer is dissolved in the organic solvent.

The conductive polymer solution is prepared by synthesizing a polyanion, conducting chemical oxidative polymerization of a precursor monomer of the π-conjugated conductive polymer in the presence of the polyanion and the solvent to obtain a solution of the π-conjugated conductive polymer and adding the nitrogen-containing compound to the solution.

Examples of the method for synthesizing a polyanion include a method of directly introducing an anion group into a polymer having no anion group using an acid, a method of converting a polymer having no anion group into a sulfonic acid using a sulfonating agent, and a method of polymerizing an anion group-containing polymerizable monomer.

The method for preparing a polyanion by polymerizing an anion group polymerizable monomer and the specific anion group polymerizable monomer are the same as those described for the π-conjugated conductive polymer.

Examples of the oxidizing agent and the oxidation catalyst used in case of polymerizing the anion group-containing polymerizable monomer include peroxodisulfates such as ammonium peroxodisulfate (ammonium persulfate), sodium peroxodisulfate (sodium persulfate), and potassium peroxodisulfate (potassium persulfate); transition metal compounds such as ferric chloride, ferric sulfate, ferric nitrate, and cupric chloride; metal halogen compounds such as boron trifluoride; metal oxides such as silver oxide and cesium oxide; peroxides such as hydrogen peroxide and ozone; organic peroxides such as benzoyl peroxide; and oxygen.

As the solvent, a solvent constituting the conductive polymer solution can be used.

The polymerizable monomer having no anion group is the same as those described for the π-conjugated conductive polymer.

The precursor monomer of the π-conjugated conductive polymer, which is subjected to the chemical oxidative polymerization in the presence of the polyanion, is the same as those described for the π-conjugated conductive polymer.

The oxidizing agent and the oxidation catalyst used in the chemical oxidative polymerization of the precursor monomer of the π-conjugated conductive polymer are the same as those used to synthesize the polyanion.

The solvent is a solvent which can dissolve or disperse the precursor monomer and can maintain oxidizability of the oxidizing agent and the oxidation catalyst, and is the same as those which is contained in the conductive polymer solution.

In case of polymerization, with the growth of a main chain of the π-conjugated conductive polymer, an anion group of the polyanion forms a salt with the π-conjugated conductive polymer, and thus the main chain of the π-conjugated conductive polymer grows along the polyanion. Therefore, the resulting π-conjugated conductive polymer and the polyanion are converted into a complex in which a salt is innumerably formed. In this complex, it is considered that 1 unit of the anion group forms a salt with 3 units of the π-conjugated conductive polymer and several π-conjugated conductive polymers grown to a short length form a salt along the long polyanion.

In case of adding the nitrogen-containing compound, the residual π-conjugated conductive polymer, which does not form a salt with the polyanion, forms a salt with a quaternary salt of the nitrogen-containing compound as a cation in a uniform solvent.

When the nitrogen-containing compound has an unsaturated double bond, the unsaturated double bonds are polymerized by a radical polymerization method, a thermal polymerization method, a photopolymerization method, a cationic polymerization method or a plasma polymerization method.

In the radical polymerization method, the polymerization is conducted by using, as a polymerization initiator, azo compounds such as azobisisobutyronitrile, and peroxides such as benzoyl peroxide, diacylperoxides, peroxyesters, and hydroperoxides.

In the photopolymerization method, the polymerization is conducted by using, as a polymerization initiator, a carbonyl compound, a sulfur compound, an organic peroxide, and an azo compound. Specific examples of the polymerization initiator include benzophenone, 4,4-bis(dimethylamine)benzophenone, 4-methoxy-4'-dimethylaminobenzophenone, 4,4'-dimethoxybenzophenone, 4-dimethylaminobenzophenone, 4-dimethylaminoacetophenone, anthraquinone, 2-t-butylanthraquinone, 2-methylanthraquinone, 2,4-diethylthioxantone, fluorenone, acridone, Michler's ketone, xanthone, thioxantone, 2-ethylanthraquinone, acetophenone, trichloroacetophenone, 2-hydroxy-2-methyl-propiophenone, 1-hydroxycyclohexyl phenyl ketone, benzoin methyl ether, benzoin ethyl ether, benzoin isopropyl ether, benzoin phenyl ether, 2,2-diethoxyacetophenone, 2,2-dimethoxy-2-phenylacetophenone, benzyl, methylbenzoyl formate, 1-phenyl-1, 2-propanedion-2-(o-benzoyl)oxime, 2,4,6-trimethylbenzoyldiphenyl phosphine oxide, tetramethylthiuram, dithiocarbamate, benzoyl peroxide, N-lauryl pyridium azide, and polymethylphenylsilane.

In case of photopolymerizing, sensitizers for improving photosensitivity may be added. Specific examples of the sensitizers include 2,5-bis(4'-diethylaminobenzal)cyclopentanone, 2,6-bis(4'-dimethylaminobenzyl)cyclohexanone, 2,6-bis(4'-diethylaminobenzal)-4-methylcyclohexanone, 4,4'-bis(dimethylamino)chalcone, 4,4'-bis(diethylamino)chalcone, 2-(p-dimethylaminophenylvinylene)benzothiazole, 2-(p-dimethylaminophenylvinylene)-isonaphthothiazole, and 3,3'-carbonyl-bis(7-diethylaminocumarin). These sensitizers may be used alone or in combination. The sensitizers include those which serve as photopolymerization initiators.

Examples of the cationic polymerization initiator used in the cationic polymerization method include aryldiazonium salts, diarylhalonium salts, triphenylsulfonium salts, silanol/aluminum chelate, and α-sulfonyl oxyketones.

In the plasma polymerization, when irradiated with plasma for a short time, fragmentation and rearrangement are conducted by receiving energy due to electron bombardment of plasma, and then a polymer is produced by recombination of radicals.

These polymerization reactions may be conducted in the form of a conductive polymer solution, or may be conducted in case of drying after coating.

In the conductive polymer solution described above, the nitrogen-containing compound is quaternized to form a cation and a quaternized nitrogen-containing functional group of the nitrogen-containing compound forms a salt with the residual anion group of the polyanion, which was not used to form a salt with the π-conjugated conductive polymer. As a result, conductivity and solvent solubility are improved.

When the nitrogen-containing compound has at least one saturated double bond, a crosslink point is formed by an unsaturated double bond. By polymerizing the unsaturated double bond, the polyanion, and the π-conjugated conductive polymer, which forms a salt with the nitrogen-containing compound, can be crosslinked. As a result, an intermolecular distance of the complex of the π-conjugated conductive polymer and the polyanion decreases, resulting in focusing, and thus activation energy due to hopping in electron transfer between the π-conjugated conductive polymers can be reduced and conductivity can be enhanced (specifically, electric conductivity of 100 S/cm can be realized). It is also considered that, since molecular density increases due to crosslinking of an unsaturated double bond, thermostability, film forming properties and abrasion resistance are improved.

<Conductive Resin>

The conductive resin of the present invention is obtained by removing an organic solvent from the above conductive polymer solution. The method of removing the organic solvent is not specifically limited and examples thereof include a heat drying method and vacuum drying method.

The conductive resin preferably contains a binder resin in view of scratch resistance. That is, the conductive resin is preferably obtained from a conductive polymer solution containing a binder resin. If the conductive resin contains the binder resin, pencil hardness (JIS K 5400) of the conductive resin is easily set to HB or higher.

<Method for Preparing Antistatic Coating Material>

As the method for preparing an antistatic coating material, for example, a liquid-liquid extraction method can be employed. In an example of the method for preparing an antistatic coating material by the liquid-liquid extraction method, first, an organic solvent is added to an aqueous solution of a complex of the π-conjugated conductive polymer and the solubilizable polymer. Subsequently, a phase transfer catalyst is added, followed by stirring or shaking. After standing for a while, the resulting solution is separated into an aqueous layer and an organic solvent layer and the aqueous layer is removed to obtain a solution in which the solvent is an organic solvent. Then, a hard coat component is added to the solution to obtain an antistatic coating material.

The antistatic coating material can also be prepared by another method. In an example of another method for preparing an antistatic coating material, first, a phase transfer catalyst is added to an aqueous solution of a complex of the π-conjugated conductive polymer and the solubilizable polymer, to thereby precipitate a mixture containing the π-conjugated conductive polymer, the solubilizable polymer, and the phase transfer catalyst, and then the resulting mixture is collected. Then, the mixture is dissolved in an organic solvent and a hard coat component is added to obtain an antistatic coating material.

In the method for preparing an antistatic coating material, in both cases, an aqueous polymer solution containing the π-conjugated conductive polymer and the solubilizable polymer is preferably used. In the method for preparing an aqueous polymer solution, first, the solubilizable polymer is dissolved in a solvent which dissolves the polymer and then a precursor monomer of the π-conjugated conductive polymer and, if necessary, a dopant are added, followed by fully mixing with stirring. To the mixture thus obtained, an oxidizing agent is added, thereby allowing the polymerization to proceed to obtain a complex of the π-conjugated conductive polymer and the solubilizable polymer. Then, the complex is purified by removing the oxidizing agent, the residual monomer and by-products.

In the above antistatic coating material, since the phase transfer catalyst is coordinated to an anion group or an electron attractive group of the solubilizable polymer and oil solubility of the solubilizable polymer is enhanced, the π-conjugated conductive polymer, which forms a complex with the solubilizable polymer, is dissolved in an organic solvent and compatibility with the hard coat component is secured.

The π-conjugated conductive polymer contained in the antistatic coating material is not a polymer of an oil soluble special monomer and therefore has high conductivity and is excellent in antistatic properties and also the content of the π-conjugated conductive polymer in the antistatic coating material, resulting in excellent transparency.

Since the antistatic coating material contains a hard coat component, scratch resistance and surface hardness of the coating film can be enhanced. Specifically, pencil hardness (JIS K 5400) of the hard coat layer formed of the antistatic coating material can be set to HB or higher.

<Antistatic Hard Coat Layer>

The antistatic hard coat layer of the present invention is formed by coating the above antistatic coating material. Examples of the method for coating the antistatic coating material include dipping, comma coating, spray coating, roll coating, and gravure printing methods.

After coating, the solvent may be removed by heating or the antistatic coating material may be cured by heat or light. As the heating method, for example, conventional methods such as hot-air heating and infrared heating methods can be employed. As the light irradiation method in case of forming a coating film by photocuring, for example, there can be employed methods for irradiating with ultraviolet light from light sources such as a ultrahigh-pressure mercury lamp, high-pressure mercury lamp, low-pressure mercury lamp, carbon arc, xenon arc, and metal halide lamp.

Examples of the base material on which the antistatic hard coat layer is formed include low density polyethylene film, high density polyethylene film, ethylene-propylene copolymer film, polypropylene film, ethylene-vinyl acetate copolymer film, ethylene-methyl methacrylate copolymer film, polyethylene terephthalate (PET) film, polybutylene terephthalate (PBT) film, polyethylene naphthalate (PEN) film, polyimide film, 6-nylon film, 6,6-nylon film, polymethyl methacrylate film, polystyrene film, styrene-acrylonitrile-butadiene copolymer film, polyacrylonitrile film, triacetic acid cellulose (TAC) film, cellulose propionate film, polyvinyl chloride film, polyvinylidene chloride film, polyvinylidene fluoride film, polyethylene tetrafluoride film, polyvinyl alcohol film, ethylene-vinyl alcohol copolymer film, polycarbonate film, polysulfone film, polyether sulfone film, polyether ether ketone film, and polyphenylene oxide film.

It is preferred that the surface of the base material be previously subjected to an etching treatment such as sputtering, colona discharge, flame treatment, irradiation with ultraviolet light, irradiation with an electron beam, chemical treatment or oxidation, and a hydrophilization treatment such as under coating treatment for the purpose of enhancing affinity with the antistatic coating material. If necessary, dust removal and cleaning may be conducted by solvent cleaning and ultrasonic cleaning.

The antistatic hard coat layer is formed of the above antistatic coating material and therefore has high hardness and is excellent in antistatic properties and transparency.

When the antistatic hard coat layer is used for optical applications, particularly an optical filter described hereinafter, it is preferred that transparency be excellent. Specifically, total light transmittance (JIS Z 8701) is preferably 85% or more, more preferably 90% or more, and particularly preferably 96% or more. Haze (JIS K 6714) is preferably 5% or less, more preferably 3% or less, and particularly preferably 1% or less.

Furthermore, surface hardness (pencil hardness according to JIS S 6006) is preferably HB or higher.

It is preferred that the surface resistance value of the antistatic hard coat layer be appropriately adjusted according to optical characteristics. When surface resistance value is from about $1\times10^3$ to $1\times10^{12}\Omega$, it can be used for antistatic applications.

Light transmittance, haze, surface resistance value and surface hardness of the antistatic hard coat layer can be adjusted by the thickness of the coating film.

<Optical Filter>

An embodiment of the optical filter of the present invention will now be described in detail.

In FIG. 1, an optical filter of this embodiment is shown. This optical filter 1 is composed of a film base material 10, an antistatic hard coat layer 20 formed on the film base material 10, and an antireflection layer 30 formed on the antistatic hard coat layer 20.

When this optical filter 1 is applied onto the display surface of a display device, a transparent tacky adhesive layer is formed on the surface of the film base material 10 side of the optical filter 1 and the optical filter is applied through the tacky adhesive layer.

As the film base material 10, various plastic films having transparency can be used. Examples of the transparent plastic film include films formed of polyethylene terephthalate, polyimide, polyether sulfone, polyether ether ketone, polycarbonate, polypropylene, polyamide, acrylamide and cellulose propionate.

The surface of the film base material 10 is preferably subjected to an etching treatment such as sputtering, colona discharge, flame treatment, irradiation with ultraviolet light, irradiation with an electron beam, chemical treatment or oxidation, or an under coating treatment. When the surface is subjected to such a treatment, adhesion to the antistatic hard coat layer 20 can be further enhanced.

Before forming the antistatic hard coat layer 20 on the surface of the film base material 10, dust removal and cleaning may be conducted by solvent cleaning and ultrasonic cleaning, if necessary.

As described above, the antistatic hard coat layer 20 is a film formed of the antistatic coating material and this antistatic hard coat layer 20 preferably has surface hardness (pencil hardness) of HB or higher. Because of optical applications, total light transmittance (JIS Z 8701) of the antistatic hard coat layer 20 is preferably 85% or more, more preferably 90% or more, and particularly preferably 96% or more. Also haze (JIS K 6714) of the antistatic hard coat layer 20 is preferably 5% or less, more preferably 3% or less, and particularly preferably 1% or less.

The antireflection layer 30 is a layer which prevents reflection of light. This layer may be a single-layer or a multi-layer. In case of the single-layer, its refractive index is preferably within a range from 1.38 to 1.45 and its optical film thickness is preferably within a range from 80 to 100 nm.

The antireflection layer 30 can be formed by a dry method or a wet method. Examples of the dry method include physical vapor deposition methods such as an electron-beam deposition method, a dielectric heating deposition method, a resistance heating deposition method, a sputtering method, an ionplating method, and a plasma CVD method. When the antireflection layer 30 is formed by the dry method, inorganic compounds such as silicon oxide, magnesium fluoride, niobium oxide, titanium oxide, tantalum oxide, aluminum oxide, zirconium hydroxide, indium oxide, and tin oxide can be used as the component of the antireflection layer 30.

Examples of the wet method include a method comprising coating a coating material containing a curable compound by a known method such as comma coating, spray coating, roll coating or gravure printing method and curing the coating material. When an antireflection layer 30 is formed by the wet method, fluorine-containing compounds such as fluorine-containing organic compounds, fluorine-containing organic silicon compounds, and fluorine-containing inorganic compounds can be used as the curable compound.

In the optical filter 1, an antistaining layer may be formed on the antireflection layer 30. When the antistaining layer is formed, it is made possible to prevent adhesion of dusts or stains or to easily remove dusts or stains when adhered.

The antistaining layer is not specifically limited as far as it does not inhibit an antireflection function of the antireflection layer 30, exhibits high water repellency and oil repellency and can prevent adhesion of stains, and may be a layer made of an organic compound or a layer made of an inorganic compound. Examples of the antistaining layer include a layer containing an organic silicon compound having a perfluorosilane group or a fluorocycloalkyl group, or a fluorine organic compound.

The method for forming an antistaining layer can be appropriately selected according to the kinds and, for example, there can be employed a physical vapor deposition method or a chemical vapor deposition method, such as deposition method, sputtering method or ionplating method, vacuum process such as plasma polymerization method, microgravure method, screen coating method or dip coating method.

In the optical filter 1 described above, an antistatic hard coat layer 20 for protecting a film base material 10 is formed and the antistatic hard coat layer 20 is formed of the antistatic coating material, and therefore the optical filter has sufficient hardness and is excellent in transparency and is also excellent in adhesion to the film base material 10. Since the antistatic hard coat layer 20 is excellent in stability of antistatic properties, dusts hardly adhere onto the surface of the optical filter 1.

Such an optical filter 1 is suited for use in an antireflection film, an infrared absorbing film and an electromagnetic wave absorbing film of image planes of liquid crystal and both surfaces of a plasma display.

The optical filter of the present invention is not limited to the above embodiments and may have an antistatic hard coat layer formed of the above antistatic coating material. It is also possible to use a polarizing plate in place of the film base material. Examples of the polarizing plate include those obtained by laminating a protective film on one or both sides of a polyvinyl alcohol-based resin film in which a dichroic pigment is adsorbed and oriented. As the dichroic pigment, iodine and dichroic dye can be used. Such an optical filter can be formed on the outermost surface of a liquid crystal display device.

<Conductive Coating Film>

The conductive coating film of the present invention is formed by coating the above conductive polymer solution. Examples of the method of coating the conductive polymer solution include dipping, comma coating, spray coating, roll coating, and gravure printing methods.

After coating, the coating film is preferably cured by heating treatment or ultraviolet irradiation treatment. In the heating treatment, for example, conventional methods such as hot air heating and infrared ray heating methods can be employed. In the ultraviolet irradiation treatment, for example, there can be employed a method of irradiating with ultraviolet light from light sources such as an ultrahigh-pressure mercury lamp, high-pressure mercury lamp, low-pressure mercury lamp, carbon arc, xenon arc, and metal halide lamp.

The above conductive coating film is formed by coating the above conductive polymer solution and is therefore excellent in conductivity. When the nitrogen-containing compound has an unsaturated double bond and the unsaturated double bond is polymerized, thermostability is excellent and also film forming properties and abrasion resistance are excellent.

<Method for Preparing Antistatic Tacky Adhesive>

As a method for preparing an antistatic tacky adhesive, for example, a liquid-liquid extraction method can be employed.

In an example of the method for preparing an antistatic tacky adhesive by the liquid-liquid extraction method, first, chemical oxidative polymerization of a precursor monomer of the π-conjugated conductive polymer is conducted in an aqueous solution of the solubilizable polymer to obtain an aqueous solution of a complex of the π-conjugated conductive polymer and the solubilizable polymer. An organic solvent is added to the aqueous solution of the complex of the π-conjugated conductive polymer and the solubilizable polymer. Subsequently, a phase transfer catalyst is added, followed by stirring or shaking. After standing for a while, the resulting solution is separated into an aqueous layer and an organic solvent layer and the aqueous layer is removed to obtain a solution in which the solvent is an organic solvent. Then, a tacky adhesive component is added to the solution to obtain an antistatic tacky adhesive.

The antistatic tacky adhesive can be prepared by another method. In the other example of the method for preparing an antistatic tacky adhesive, first, chemical oxidative polymerization of a precursor monomer of the π-conjugated conductive polymer is conducted in an aqueous solution of the solubilizable polymer to obtain an aqueous solution of a complex of the π-conjugated conductive polymer and the solubilizable polymer. A phase transfer catalyst is added to the aqueous solution of the complex of the π-conjugated conductive polymer and the solubilizable polymer, to thereby precipitate a mixture of the π-conjugated conductive polymer, the solubilizable polymer, and the phase transfer catalyst, and then the resulting mixture is collected. Then, the mixture is dissolved in an organic solvent and a tacky adhesive component is added to obtain an antistatic tacky adhesive.

In the antistatic tacky adhesive, since the phase transfer catalyst is coordinated to the anion group or the electron attractive group of the solubilizable polymer and oil solubility of the solubilizable polymer is enhanced, the π-conjugated conductive polymer, which forms a complex with the solubilizable polymer, is dissolved in an organic solvent other than an alcohol, or a liquid organic compound such as acryl monomer. Since any tacky adhesive component can secure compatibility, limitation of the acrylic polymer is reduced. When limitation of the acrylic polymer is reduced, performances of the tacky adhesive can be broadened.

As described above, the antistatic tacky adhesive, in which a water soluble complex of the π-conjugated conductive polymer and the solubilizable polymer is converted into an oil soluble complex by the phase transfer catalyst, is excellent in storage stability. Therefore, even when stored for a long period, the π-conjugated conductive polymer is hardly aggregated or disaggregated, and deterioration of transparency or conductivity of the tacky adhesive layer is prevented.

Furthermore, storage stability of the antistatic tacky adhesive is enhanced. As a result, it becomes unnecessary to continuously conduct from preparation of the antistatic tacky adhesive to preparation of the protective material, and thus the method for preparing a protective material can be provided with flexibility.

<Antistatic Tacky Adhesive Layer>

The antistatic tacky adhesive layer of the present invention is formed by coating the above antistatic tacky adhesive.

Examples of the method for coating an antistatic tacky adhesive include dipping, comma coating, spray coating, roll coating, gravure roll coating, and a spin coating method. However, the method is not specifically limited as far as it is a conventional method for foaming a coating film.

After coating, the coating film is cured by heating or irradiating with light to obtain an antistatic tacky adhesive layer. As the heating method, for example, conventional methods such as hot-air heating and infrared heating methods can be employed. As the light irradiation method, for example, there can be employed methods for irradiating with ultraviolet light from light sources such as an ultrahigh-pressure mercury lamp, high-pressure mercury lamp, low-pressure mercury lamp, carbon arc, xenon arc, and metal halide lamp.

The thickness of the antistatic tacky adhesive layer is not specifically limited and is preferably from 0.01 µm to 5 mm, more preferably from 0.1 µm to 0.5 mm, and particularly preferably from 1 to 50 µm. When the thickness of the antistatic tacky adhesive layer is less than 0.01 µm, tacky adhesiveness and antistatic properties may be insufficient. On the other hand, when the thickness exceeds 5 mm, internal fracture of the antistatic tacky adhesive layer occurs and the antistatic tacky adhesive layer may remain on the object to be protected.

<Protective Material>

The protective material of the present invention comprises a base material and the above antistatic tacky adhesive layer formed on the base material, and examples thereof include protective tapes such as cover tape and carrier tape, and protective sheets, and protective film.

The base material is not specifically limited as far as it can hold the antistatic tacky adhesive, and a plastic base material is preferable in view of transparency. Examples of the plastic base material include polyesters such as polyethylene terephthalate, polybutylene terephthalate, and polyethylene naphthalate; celluloids such as triacetyl cellulose; polyethylenes; polypropylenes; ABS resins; acrylic resins; polyamides; polycarbonates; polyamides; phenoxy resins; and epoxy resins. Among these base materials, polyethylene terephthalate is preferable in view of moldability and general-purpose properties.

To improve adhesion with the antistatic tacky adhesive, the coated surface of the base material may be subjected to a pretreatment such as primer treatment, plasma treatment or arc discharge treatment.

The thickness of the base material is not specifically limited and is preferably from 0.01 µm to 10 mm, more preferably from 0.1 µm to 1 mm, and particularly preferably from 1 µm to 0.5 mm, in view of ease of removing from the object to be protected and transparency. When the thickness of the base material is less than 0.01 µm, the strength is insufficient. On the other hand, when the thickness exceeds 10 mm, handling properties upon removal deteriorate.

The protective material of the present invention comprises an antistatic tacky adhesive layer formed by coating the antistatic tacky adhesive and is therefore excellent in transparency and conductivity (antistatic properties).

EXAMPLES

The present invention will now be described in more detail by way of examples, but the present invention is not limited to the following examples. In the following examples, parts and percentages are by weight unless otherwise specified.

Preparation Example 1

Synthesis of Polystyrenesulfonic Acid 206 g of sodium styrenesulfonate was dissolved in 1000 ml of ion-exchange water and 1.14 g of an ammonium persulfate oxidizing agent solution prepared previously dissolving in 10 ml of water was added dropwise for 20 minutes while stirring at 80° C., and then the resulting solution was stirred for 12 hours.

To the resulting sodium styrenesulfonate-containing solution, 1000 ml of sulfuric acid diluted by 10% by mass was added and about 1000 ml of a polystyrenesulfonic acid-containing solution was removed by using an ultrafiltration method. To the residual solution, 2000 ml of ion-exchange water was added and about 2000 ml of the solution was removed by using an ultrafiltration method. The above ultrafiltration operation was repeated 3 times.

To the resulting filtrate, about 2000 ml of ion-exchange water was added and about 2000 ml of the solution was removed by using an ultrafiltration method. The above ultrafiltration operation was repeated 3 times.

Water in the resulting solution was removed under reduced pressure to obtain a colorless solid matter.

Preparation Example 2

14.2 g of 3,4-ethylenedioxythiophene was mixed with a solution prepared by dissolving 36.7 g of polystyrenesulfonic acid in 2000 ml of ion-exchange water at 20° C.

To the obtained solution mixture with maintaining at 20° C., a solution prepared by dissolving 29.64 g of ammonium persulfate in 200 ml of ion-exchange water and an oxidation catalyst solution of 8.0 g of ferric sulfate were slowly added while stirring, and then the reaction was conducted for 3 hours while stirring.

To the resulting reaction solution, 2000 ml of ion-exchange water was added and about 2000 ml of the solution was removed by using an ultrafiltration method. This operation was repeated 3 times.

To the resulting solution, 200 ml of sulfuric acid diluted by 10% by mass and 2000 ml of ion-exchange water were added, and then about 2000 ml of the solution was removed by using an ultrafiltration method. To the solution, 2000 ml of ion-exchange water was added and about 2000 ml of the solution was removed by using an ultrafiltration method. This operation was repeated 3 times.

To the resulting solution, 2000 ml of ion-exchange water was added and about 2000 ml of the solution was removed by using an ultrafiltration method. This operation was repeated 5 times to obtain a blue aqueous solution (about 1.5% by mass) of polystyrenesulfonic acid doped poly(3,4-ethylenedioxythiophene) (PSS-PEDOT).

Example 1

Conductive Polymer Solution Containing Toluene

To a solution mixture prepared by adding 200 ml of acetone and 200 ml of toluene to 200 ml of the aqueous PSS-PEDOT solution of Preparation Example 2, 3.2 g of 1-dodecyl-2-methyl-3-benzylimidazolium chloride (phase transfer catalyst) synthesized in our company was added, followed by vigorous shaking. After standing, the organic solvent layer as an upper layer and the aqueous layer as a lower layer were separated and the aqueous layer was removed by isolation, followed by a nanomizer treatment to obtain a toluene solution of PSS-PEDOT as a conductive polymer solution.

Example 2

Conductive Polymer Solution Containing Chloroform

To a solution mixture prepared by adding 10 ml of chloroform to 10 ml of the aqueous PSS-PEDOT solution of Preparation Example 2, 200 mg of cetylpyridinium chloride as a phase transfer catalyst was added, followed by vigorous shaking. After standing, the aqueous layer as an upper layer and the organic solvent layer as a lower layer were separated and the aqueous layer was removed by isolation, followed by a nanomizer treatment to obtain a toluene solution of PSS-PEDOT as a conductive polymer solution.

Example 3

Conductive Polymer Solution Containing Dimethylacetamide

To the aqueous PSS-PEDOT solution of Preparation Example 2, 160 mg of Curesol SFZ was added and, after vigorously shaking, a solid component was recovered by filtration. The solid component was added in 20 ml of dimethylacetamide, and dispersed and dissolved in an ultrasonic washer, followed by a nanomizer treatment to obtain a dimethylacetamide solution of PSS-PEDOT as a conductive polymer solution.

Each of the conductive polymer solutions of Examples 1 to 3 was dip-coated onto a glass substrate to obtain a coating film of the conductive polymer solution. A surface resistance value of the resulting coating film was measured by HIRESTA manufactured by Dia instrument Co., Ltd. The results are shown in Table 1.

TABLE 1

|  | Example 1 | Example 2 | Example 3 |
|---|---|---|---|
| Organic solvent | Toluene | Chloroform | Dimethylacetamide |
| Surface resistance value ($\Omega$) | $2 \times 10^4$ | $5 \times 10^4$ | $8 \times 10^5$ |

As described above, the organic solvent solution of PSS-PEDOT was prepared by adding the phase transfer catalyst to the aqueous PSS-PEDOT solution. The drying rate of the organic solvent solution of PSS-PEDOT used in case of forming a coating film is large. Moreover, conductivity is sufficiently secured.

Example 4

Antistatic Coating Material

To a solution mixture prepared by adding 200 ml of acetone and 200 ml of toluene to 200 ml of the aqueous PSS-PEDOT solution of Preparation Example 2, 3.2 g of 1-dodecyl-2-methyl-3-benzylimidazolium chloride (phase transfer catalyst) synthesized in our company was added, followed by vigorous shaking. After standing, the organic solvent layer as an upper layer and the aqueous layer as a lower layer were separated and the aqueous layer was removed by isolation, followed by a nanomizer treatment to obtain a toluene solution of PSS-PEDOT.

160 g of ART RESIN UN-3320HS manufactured by Negami Chemical Industries Co., Ltd., 20 g of LIGHT-ACRYLATE PE-3A manufactured by Kyoeisha Chemical Co., Ltd. and 30 g of 2-hydroxyethyl acrylate were weighed and then mixed with stirring to obtain an acrylic resin composition (hard coat component).

Then, 30 g of a toluene solution of PSS-PEDOT, 40 g of an acrylic resin composition, 20 g of methyl ethyl ketone and 10 g of isopropanol were mixed and then subjected to a nanomizer treatment to obtain an antistatic coating material.

This antistatic coating material was evaluated in the following manner. That is, Irgacure 754 (manufactured by Ciba Specialty Chemicals) as a polymerization initiator was added to the antistatic coating material, and the coating material was coated onto a TAC film by a comma coater, dried and then cured by exposing to light from a high-pressure mercury lamp to form a 5 μm thick antistatic hard coat layer. Surface resistance value, visible light transmittance and haze of this layer were measured. The results are shown in Table 2.

TABLE 2

|  | Example 4 | Comparative Example 1 |
|---|---|---|
| Surface resistance value (Ω) | $5 \times 10^8$ | $2 \times 10^8$ |
| Visible light transmittance (%) | 96 | 75 |
| Haze (%) | 0.29 | 7.00 |

Comparative Example 1

15 g of an ITO powder, 60 g of dimethylformamide (DMF), 75 g of ethanol and 200 g of zirconia beads were mixed and stirred for about 1 to 24 hours using a ball mill, and then the pH of the resulting ITO colloidal solution was adjusted within a range from 2 to 8. This ITO colloidal solution was diluted with a solvent mixture of methanol, ethanol, butanol, 2-methoxyethanol and 1-methoxy 2-propanol to prepare an ITO colloidal coating solution having an ITO concentration of 1.0 to 1.5% by mass.

The resulting ITO colloidal coating solution was spin-coated on a hard coat layer of a film base material at a rate of 300 rpm to form an ITO layer. Then, a silica coating solution was spin-coated onto the ITO layer at a rate of 300 rpm and heated at 100° C. for 30 minutes to obtain a laminate comprising a film base material, a hard coat layer, an ITO layer and a silica.

The evaluation results of the resulting laminate are shown in Table 2.

The hard coat layer formed of the antistatic coating material containing a conductive polymer component, a hard coat component and a phase transfer catalyst of Example 4 had sufficient antistatic properties and also showed high visible light transmittance and small haze. On the other hand, the hard coat layer formed of the antistatic coating material prepared by mixing ITO with a hard coat component of Comparative Example 1 showed low visible light transmittance and large haze.

Example 5

Production of Optical Filter

The other surface of a PET film (film base material) comprising a tacky adhesive layer and a cover film laminated on one surface was subjected to a corona treatment. On the corona-treated surface of the PET film, the antistatic coating material of Example 4 was coated by a comma coater. After drying, the antistatic coating material was cured by irradiating with ultraviolet light from a high-pressure mercury lamp to form an antistatic hard coat layer. Then, a solution prepared by adding 42.0 g of ethanol to 80 g of an ethanol dispersion (manufactured by Catalyst&Chemicals Ind. Co., Ltd., solid content: 15.6% by mass) of hollow silica including fine holes therein was coated onto the antistatic hard coat layer. After drying and subjecting to a heat treatment at 100° C. for one hour to form a 90 μm thick antireflection layer, and thus an optical filter was obtained.

Visible light transmittance, haze, surface resistance, pencil hardness and adhesion of the resulting optical filter were evaluated.

[Measurement of visible light transmittance, haze and surface resistance] Visible light transmittance was 94.3%, haze was 0.4%, and surface resistance value was $4 \times 10^8 \Omega$, respectively.

[Pencil hardness test] Using a pencil for test defined in JIS S 6006, the hardness, at which any scratch is not observed when a load of 1 Kg is applied, was measured according to JIS K 5400. As a result, pencil hardness was H.

[Adhesion test] According to a cross cut tape method (JIS K 5400), an adhesion test was conducted.

Specifically, 11 vertical cut lines and 11 horizontal cut lines were formed on the surface of the side of the antireflection layer of the optical film at an interval of about 1 mm respectively so as to form 100 squares using a cutter, followed by adhering a tacky adhesive tape thereonto, and separating tape to count the number of squares remained on the PET film. As a result, all 100 squares are remained in this optical film (100/100).

This optical filter was found to be an optical filter in which the hard coat layer has sufficient hardness and is also excellent in transparency, antistatic properties and adhesion with a base material.

Preparation of Complex of π-Conjugated Conductive Polymer and Polyanion

Preparation Example 1

Preparation of Complex Solution (Complex Solution 1) of Poly(Ethylenedioxythiophene) and Polyallylsulfonic Acid 145 g (1 mol) of sodium allylsulfonate was dissolved in 1000 ml of ion-exchange water and 1.14 g (0.005 mol) of an ammonium persulfate oxidizing agent solution prepared previously by dissolving in 10 ml of water was added dropwise for 20 minutes while stirring at 80° C., followed by continuous stirring for 12 hours.

To the resulting solution, 1000 ml of sulfuric acid diluted by 10% by mass was added and then about 1000 ml of the solution was removed by using an ultrafiltration method. To the solution, 2000 ml of ion-exchange water was added and then about 2000 ml of the solution was removed by using an ultrafiltration method. The above ultrafiltration operation was repeated 3 times. Water in the resulting solution was removed under reduced pressure to obtain a colorless solid matter.

Subsequently, 14.2 g (0.1 mol) of ethylenedioxythiophene was mixed with a solution prepared by dissolving 21.8 g (0.15 mol) of polyallylsulfonic acid in 2000 ml of ion-exchange water.

This solution mixture was maintained at 20° C. and 8.0 g (0.02 mol) of an oxidation catalyst solution of ferric sulfate prepared by dissolving 29.64 g (0.13 mol) of ammonium persulfate in 200 ml of ion-exchange water was slowly added while stirring, and then the reaction was conducted while stirring for 5 hours.

To the resulting reaction solution, 2000 ml of ion-exchange water was added and then about 2000 ml of the solution was removed by using an ultrafiltration method. This operation was repeated 3 times.

To the resulting solution, 2000 ml of ion-exchange water was added and then about 2000 ml of the solution was removed by using an ultrafiltration. After moisture was reduced to about 1% or less by evaporation and freeze-drying, the resulting product was dissolved in N,N-dimethylacetamide to obtain a blue 1.5% by mass polyallylsulfonic acid doped poly(ethylenedioxythiophene) (PEDOT) solution. This solution was referred to as a complex solution 1.

Preparation Example 2

Preparation of Complex Solution (Complex Solution 2) of Polypyrrole and Polystyrenesulfonic Acid 185 g (1 mol) of sodium styrenesulfonate was dissolved in 1000 ml of ion-exchange water and 1.14 g (0.005 mol) of an ammonium persulfate oxidizing agent solution prepared previously by dissolving in 10 ml of water was added dropwise for 20 minutes while stirring at 80° C., followed by continuous stirring for 12 hours.

To the resulting solution, 1000 ml of sulfuric diluted by 10% by mass acid was added and then about 1000 ml of the solution was removed by using an ultrafiltration method. To the solution, 2000 ml of ion-exchange water was added and then about 2000 ml of the solution was removed by using an ultrafiltration method. The above ultrafiltration operation was repeated 3 times. Water in the resulting solution was removed under reduced pressure to obtain a colorless solid matter.

Subsequently, 6.6 g (0.1 mol) of pyrrole was mixed with a solution prepared by adding 18.5 g (0.15 mol) of polystyrenesulfonic acid in 2000 ml of ion-exchange water.

This solution mixture was maintained at 20° C. and 8.0 g (0.02 mol) of an oxidation catalyst solution of ferric sulfate prepared by dissolving 29.64 g (0.13 mol) of ammonium persulfate in 2000 ml of ion-exchange water was slowly added while stirring, and then the reaction was conducted while stirring for 2 hours.

To the resulting reaction solution, 2000 ml of ion-exchange water was added and then about 2000 ml of the solution was removed by using an ultrafiltration method. This operation was repeated 3 times.

To the resulting solution, 200 ml of ion-exchange water was added and then about 2000 ml of the solution was removed by using an ultrafiltration. This operation was repeated 5 times to obtain a blue 1.5% by mass polystyrenesulfonic acid doped polypyrrole solution. This solution was referred to as a complex solution 2.

Preparation Example 3

Preparation of Solution of Urethane Group-Containing Compound

In a reactor equipped with a stirrer, a thermometer, a nitrogen sealing tube and a condenser, 203 g (1 mol) of isophorone diisocyanate, 46.5 g (0.75 mol) of ethylene glycol and 29 g (0.25 mol) of pentaerythritol triacrylate were charged. Subsequently, the atmosphere in the reactor was replaced by nitrogen and the temperature was raised to the reaction temperature of 60 to 70° C., and then the mixture was reacted at the same temperature for 3 hours. Then, 6.0 parts of trioctylphosphine as a catalyst was charged and the mixture was heated to 65 to 70° C. while stirring and reacted at the same temperature for 6 hours. Subsequently, the reaction was terminated by adding 3.5 pars of phosphoric acid to obtain a polymer of a urethane group-containing compound. This polymer was diluted with isopropanol, mixed with hydrochloric acid and then quaternized while stirring to obtain a 30% by mass solution of a polymer of a quaternized urethane group-containing compound. This solution is referred to as a quaternized polymer solution 1.

Measurement of Quaternization Rate

This quaternized polymer solution was formed into a film by casting and also the polymer of the urethane group-containing compound, as a base, before quaternization was similarly formed into film, and then about 0.2 g of was accurately weighed, respectively. Each film was dissolved in 50 ml of a solvent mixture of dioxane/ethanol (volume ratio: 7/3). Using an electric potential titration device i.e. Autoburette (manufactured by Hiranuma Seisakusho Co., Ltd., Comtite-7), titration was conducted with a N/10-HC104 dioxane solution and the basic nitrogen content was measured by an inflection point. As a result, the basic nitrogen content of the base film was 0.67 mmol/g and the basic nitrogen content of the quaternized polymer film (A) was 0.10 mmol/g. Consequently, the quaternization rate is found to be 85%.

Preparation Example 4

Preparation of Solution of Amide Group-Containing Compound

In a reactor equipped with a stirrer, a thermometer, a nitrogen sealing tube and a condenser, 600 ml of isopropyl alcohol, 115 g (1 mol) of N-(2-hydroxyethyl)acrylamide, 115 g (1 mol) of N-methylolacrylamide and 6.57 g (0.04 mol) of azobisisobutyronitrile were charged. Subsequently, the atmosphere in the reactor was replaced by nitrogen and the temperature was raised to the reaction temperature of 80° C. while stirring, and then the mixture was reacted at the same temperature for 6 hours. Acetone was added and a white precipitate was recovered to obtain a polymer of an amide group-containing compound. The resulting polymer was dissolved in methyl ethyl ketone and 28.2 g (0.4 mol equivalent based on a hydroxyl group) of 2-acryloyloxyethyl isocyanate was added. The atmosphere in the reactor was replaced by nitrogen and the temperature was raised to the reaction temperature of 60° C. while stirring, and then the mixture was reacted at the same temperature for 3 hours. The solvent was removed under reduced pressure to obtain a polymer of an amide group-containing compound containing an unsaturated double bond introduced therein. The polymer was diluted with isopropanol and methyl chloride was added. The temperature was raised to the reaction temperature of 50° C. while stirring and the mixture was reacted for 2 hours, thereby to conduct quaternization, and thus an about 30% by mass solution of a polymer of a quaternized amide group-containing compound was obtained. This solution is referred to as a quaternized polymer solution 2. The quaternization rate was about 90%.

Preparation Example 5

Preparation of Solution of Polymer of Compound Having no Functional Group Capable of Forming Quaternary Salt In a reactor equipped with a stirrer, a thermometer, a nitrogen sealing tube and a condenser, 600 ml of isopropyl alcohol, 116 g (1 mol) of 2-hydroxypropyl acrylate, 148 g (1 mol) of 4-vinylbenzoic acid and 6.57 g (0.04 mol) of azobisisobutyronitrile were added. The atmosphere in the reactor was replaced by nitrogen and the temperature was raised to the reaction temperature of 80° C. while stirring, and then the mixture was reacted at the same temperature for 6 hours. Acetone was added and a white precipitate was recovered to obtain a polymer of a compound having no functional group capable of forming a quaternary salt. This polymer was dissolved in methyl ethyl ketone and 28.2 g (0.4 mol equivalent based on a carboxy group) of glycidyl acrylate was added. The atmosphere in the reactor was replaced by nitrogen and the temperature was raised to the reaction temperature of 60° C. while stirring, and then the mixture was reacted at the same temperature for 3 hours. The solvent was removed under reduced pressure and the reaction solution was diluted with isopropanol to obtain a solution of a polymer of a compound which include an unsaturated double bond introduced therein and do not have a functional group capable of forming a quaternary salt. This solution is referred to as a polymer solution 3.

Example 6

To 100 ml of a complex solution 1, 2.1 g (amount of quaternary salt is 1 molar equivalent based on polyallylsulfonic acid) of the quaternized polymer solution 1 was added and then uniformly dispersed to obtain a conductive polymer solution.

The resulting conductive polymer solution was coated onto a polyethylene terephthalate (PET) film using a wire coater, dried in an oven at 100° C. for 2 minutes and then irradiated with ultraviolet light from a high-pressure mercury lamp at an integrated light quantity of 500 mJ/cm$^2$ to form a conductive coating film. Electrical characteristics of the conductive coating film were evaluated by the following procedure. The results are shown in Table 3.

Electric conductivity (S/cm): Using LORESTA (manufactured by Mitsubishi Chemical Corporation), electric conductivity of a conductive coating film was measured.

Electric conductivity retention upon heating (%): Electric conductivity $R_{25B}$ at a temperature of 25° C. of a coating film was measured. After measuring, the conductive coating film was allowed to stand in an atmosphere at a temperature of 125° C. for 300 hours, the coating film was cooled to the temperature of 25° C., and then electric conductivity $R_{25A}$ was measured. Electric conductivity retention upon heating was calculated by the following calculation formula. This electric conductivity retention upon heating serves as an indictor of thermostability.

Electric conductivity retention upon heating (%)=100× $R_{25A}/R_{25B}$

Example 7

To 100 ml of a complex solution 2, 1.1 g (amount of quaternary salt is 1 molar equivalent based on polystyrenesulfonic acid) of a quaternary salt polymer solution 2 was added and uniformly dispersed to obtain a conductive polymer solution.

In the same manner as in Example 6, a conductive coating film was formed and electrical characteristics were evaluated. The results are shown in Table 3.

Example 8

In the same manner as in Example 7, except that introduction of the unsaturated double bond was omitted in Preparation Example 4, a conductive polymer solution was obtained. In the same manner as in Example 7, a conductive coating film was formed and electrical characteristics were evaluated. The results are shown in Table 3.

Comparative Example 2

In the same manner as in Example 6, except that quaternization was omitted in Preparation Example 3, a conductive polymer solution was obtained. In the same manner as in Example 6, a conductive coating film was formed and electrical characteristics were evaluated. The results are shown in Table 4.

Comparative Example 3

In the same manner as in Example 6, except that a polymer solution 3, which does not have any of urea group, urethane group, biuret group, imide group, and amide group, of Preparation Example 5 was used in place of the quaternized polymer solution 1, a conductive polymer solution was obtained. In the same manner as in Example 6, a conductive coating film was formed and electrical characteristics were evaluated. The results are shown in Table 4.

TABLE 3

| Example No. | 1 | 2 | 3 |
|---|---|---|---|
| π-conjugated conductive polymer | PEDOT | | Polypyrrole |
| Polyanion | Polystyrenesulfonic acid | | |
| Functional group of nitrogen-containing compound | Urethane group hydrochloride | | Amide group hydrochloride |
| Double bond of nitrogen-containing compound | Yes (acryl group) | | No |
| Electric conductivity (S/cm) | 380 | 320 | 70 |
| Electric conductivity retention upon heating (%) | 94.4 | 88.1 | 24.3 |

TABLE 4

| Example No. | 4 | 5 |
|---|---|---|
| π-conjugated conductive polymer | PEDOT | |
| Polyanion | Polystyrenesulfonic acid | |
| Functional group of nitrogen-containing compound | Urethane group | Ester group |
| Double bond of nitrogen-containing compound | No | Yes (acryl group) |
| Electric conductivity (S/cm) | 24 | 11 |
| Electric conductivity retention upon heating (%) | 92.9 | 88.1 |

The conductive coating films formed of the conductive polymer solution containing a quaternized nitrogen-containing compound of Examples 6 to 8 showed high conductivity. Regarding the conductive coating films formed of the conductive polymer solution in which the nitrogen-containing compound has an unsaturated double bond of Examples 6 and 7, since the unsaturated double bond was polymerized, the film strength increased and decrease in conductivity retention ratio was prevented. That is, thermostability was improved and conductivity was further improved.

To the contrary, regarding the conductive coating films formed of the conductive polymer solution containing a compound whose functional group is not quaternized of Comparative Examples 2 and 3, since the nitrogen-containing compound does not form a salt with a polyanion, electric conductivity was not improved. However, decrease in conductivity retention ratio was prevented by polymerization of the unsaturated double bond.

Preparation Example 3

Preparation of MEK Solution of Conductive Polymer

To a solution mixture prepared by adding 200 ml of acetone and 200 ml of toluene to 200 ml of the aqueous PSS-PEDOT solution of Preparation Example 2, 3.2 g of 1-dodecyl-2-methyl-3-benzylimidazolium chloride (phase transfer catalyst) was added, followed by vigorously stirring. After standing, the organic solvent layer as an upper layer and the aqueous layer as a lower layer were separated and the aqueous layer was removed by isolation. After diluting with the same mass as that of water removed by isolation of MEK and subjecting to a nanomizer treatment, a MEK solution of PSS-PEDOT was obtained.

Preparation Example 4

Synthesis of Acrylic Copolymer 50 mol % of methyl methacrylate, 30 mol % of 2-ethylhexyl methacrylate and 20 mol % of butyl methacrylate were polymerized to obtain an acrylic copolymer.

Example 9

A MEK solution of PSS-PEDOT and an acrylic copolymer were mixed and dispersed by a nanomizer treatment so as to attain a mass ratio of 60/40 to obtain an antistatic tacky adhesive. In that case, the content of PEDOT is adjusted to 1.0% by mass based on the acrylic copolymer.

Example 10

MEK was distilled off from the antistatic tacky adhesive obtained in Example 9, followed by compatibilization by a nanomizer treatment to obtain a solvent-free antistatic tacky adhesive.

Example 11

In the same manner as in Example 9, except that the acrylic copolymer was replaced by an acryl monomer UN-9000PEP manufactured by Negami Chemical Industries Co., Ltd., an antistatic tacky adhesive was obtained.

Comparative Example 4

In the same manner as in Example 9, except that the aqueous PSS-PEDOT solution of Preparation Example 2 was solvent-substituted with isopropyl alcohol and the acrylic copolymer of Preparation Example 4 was dissolved in a solvent mixture of MEK/toluene (mass ratio: 50/50), an antistatic tacky adhesive was obtained.

The antistatic tacky adhesives of Examples 9 and 10 and Comparative Example 4 were stored at room temperature for one week and storage stability was visually evaluated. As a result, any change was not observed in the tacky adhesives of Examples 9 and 10, while a strong blue precipitate was sedimented in the tacky adhesive of Comparative Example 4 tacky adhesive. That is, the tacky adhesives of Examples 9 and 10 were excellent in storage stability.

Comparative Example 5

To a polyester emulsion (manufactured by Toyobo, Ltd., under the trade name of VILONALMD-1100, solid content: 30% by mass), a water/isopropyl alcohol solution of a thiophene-based π-conjugated conductive polymer and a polyanion (manufactured by Nagase & Co., Ltd. under the trade name of Denatron P-502S) was added, followed by stirring, thus obtaining a tacky adhesive in which the π-conjugated conductive polymer is dispersed to develop a pale purple color.

Comparative Example 6

In the same manner as in Comparative Example 5, except that VILONAL MD-1500 (manufactured by Toyobo, Ltd., solid content: 30% by mass) was used as a polyester emulsion, a tacky adhesive was obtained.

Examples 12 to 17

Preparation of Protective Material

Each of the tacky adhesives of Examples 9 to 11 and Comparative Examples 4 to 6 was coated onto a polyethylene terephthalate film (manufactured by Toray Industries, Inc. under the trade name of Lumirror) as a base material in a dry film thickness of 5 μm using a coater. After drying at 80° C., a protective material having a tacky adhesive layer was obtained.

Total light transmittance haze value and surface resistance of the resulting protective material were evaluated. The results are shown in Table 5.

Surface Resistivity

According to JIS K 6911, surface resistivity was measured using HIRESTA (manufactured by Mitsubishi Chemical Corporation).

Total Light Transmittance and Haze Value

Total light transmittance and haze value of the resulting antistatic film were measured by the procedure of a test on optical characteristics of plastics defined in JIS K 7361-1.

TABLE 5

|  | Example 9 | Example 10 | Example 11 | Comparative Example 4 | Comparative Example 5 | Comparative Example 6 |
|---|---|---|---|---|---|---|
| Total light transmittance (%) | 95 | 95 | 93 | 93 | 78 | 66 |
| Haze (%) | 1.0 | 1.0 | 1.4 | 2.5 | 11 | 24 |
| Surface resistance value (Ω) | $1 \times 10^7$ | $1 \times 10^7$ | $5 \times 10^9$ | $5 \times 10^7$ | $8 \times 10^{10}$ | $6 \times 10^{12}$ |

The antistatic tacky adhesives containing the π-conjugated conductive polymer, a polyanion, a phase transfer catalyst, a tacky adhesive component and MEK as a solvent of Examples 9 and 11 were excellent in storage stability and could form an antistatic tacky adhesive layer having excellent transparency and high conductivity. As a result, as shown in Table 5, a protective material having excellent transparency and high conductivity could be obtained.

The antistatic tacky adhesive of Example 10, which contains the π-conjugated conductive polymer, a polyanion, a phase transfer catalyst, a tacky adhesive component and is free from a solvent, was excellent in storage stability and could form an antistatic tacky adhesive layer having excellent transparency and high conductivity. As a result, as shown in Table 5, a protective material having excellent transparency and high conductivity could be obtained.

The antistatic tacky adhesive of Comparative Example 4, which contains the π-conjugated conductive polymer, a polyanion, a tacky adhesive component and isopropanol used as a solvent in place of water, showed poor storage stability and also the protective material had poor transparency.

In the antistatic tacky adhesives of Comparative Examples 2 and 3, which contain a polyester emulsion and the π-conjugated conductive polymer, the protective material had poor transparency and poor conductivity.

The conductive polymer solution of the present invention can reduce the drying time required to form a coating film and the π-conjugated conductive polymer is compatible with the hydrophobic resin.

According to the method for preparing a conductive polymer solution of the present invention, it is possible to reduce the drying time required to form a coating film and to prepare a conductive polymer solution in which the π-conjugated conductive polymer is compatible with the hydrophobic resin.

The antistatic coating material of the present invention can secure compatibility between the π-conjugated conductive polymer and the hard coat component and also a coating film having both antistatic properties and transparency can be formed.

The hard coat layer of the present invention has high hardness and also have both antistatic properties and transparency.

Furthermore, the optical filter of the present invention has high hardness and is also provided with a hard coat layer having both antistatic properties and transparency.

The conductive polymer solution of the present invention is excellent in conductivity and solvent solubility.

In the conductive polymer solution of the present invention, when the nitrogen-containing compound has at least one unsaturated double bond, thermostability of the coating film formed of the conductive polymer solution can be more enhanced and also conductivity can be more enhanced.

The conductive coating film of the present invention is excellent in conductivity.

In the antistatic tacky adhesive of the present invention, a liquid organic solvent other than an alcohol can be used as a solvent and an acrylic polymer is not limited and is excellent in storage stability.

The antistatic tacky adhesive layer and the protective material of the present invention is excellent in transparency and antistatic properties.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description but is only limited by the scope of the appended claims.

What is claimed is:

1. A conductive polymer solution, comprising a π-conjugated conductive polymer, a solubilizable polymer which has at least one of an anion group and an electron attractive group, a phase transfer catalyst, and an organic solvent, wherein
the solubilizable polymer is at least one selected from the group consisting of polyvinylsulfonic acid, polystyrenesulfonic acid, polyallylsulfonic acid, polysulfoethyl acrylate, polysulfonbutyl acrylate and polyisoprenesulfonic acid, and
the phase transfer catalyst coordinates to a sulfo group of the solubilizable polymer.

2. The conductive polymer solution according to claim 1, further comprising a binder resin.

3. A conductive resin obtained by removing an organic solvent from the conductive polymer solution according to claim 2.

4. A conductive resin obtained by removing an organic solvent from the conductive polymer solution according to claim 1.

5. An antistatic coating material, comprising a π-conjugated conductive polymer, a solubilizable polymer which has at least one of an anion group and an electron attractive group, a phase transfer catalyst, a hard coat component, and an organic solvent, wherein
the solubilizable polymer is at least one selected from the group consisting of polyvinylsulfonic acid, polystyrenesulfonic acid, polyallylsulfonic acid, polysulfoethyl acrylate, polysulfonbutyl acrylate and polyisoprenesulfonic acid, and
the phase transfer catalyst coordinates to a sulfo group of the solubilizable polymer.

6. An antistatic hard coat layer formed by coating the antistatic coating material according to claim 5.

7. An optical filter comprising the antistatic hard coat layer according to claim 6.

8. An antistatic tacky adhesive, comprising a π-conjugated conductive polymer, a solubilizable polymer which has at least one of an anion group and an electron attractive group, a phase transfer catalyst, and a tacky adhesive component, wherein
the solubilizable polymer is at least one selected from the group consisting of polyvinylsulfonic acid, polystyrenesulfonic acid, polyallylsulfonic acid, polysulfoethyl acrylate, polysulfonbutyl acrylate and polyisoprenesulfonic acid, and
the phase transfer catalyst coordinates to a sulfo group of the solubilizable polymer.

9. An antistatic tacky adhesive layer formed by coating the antistatic tacky adhesive according to claim 8.

10. A protective material, comprising a base material and the antistatic tacky adhesive layer according to claim 9 formed on the base material.

* * * * *